April 8, 1941.  J. W. BRYCE  2,237,335
MULTIPLYING MACHINE
Filed April 2, 1928   12 Sheets-Sheet 1

Inventor
James W. Bryce
By his Attorneys
Cooper, Kerr & Dunham

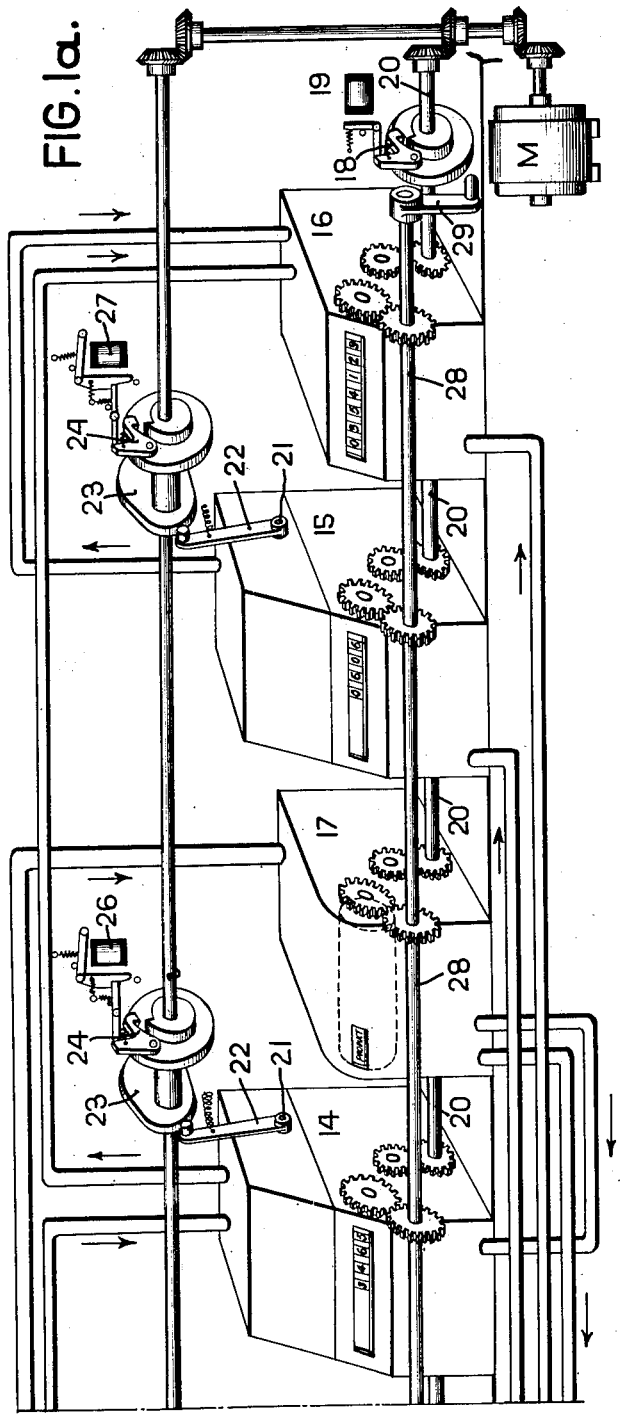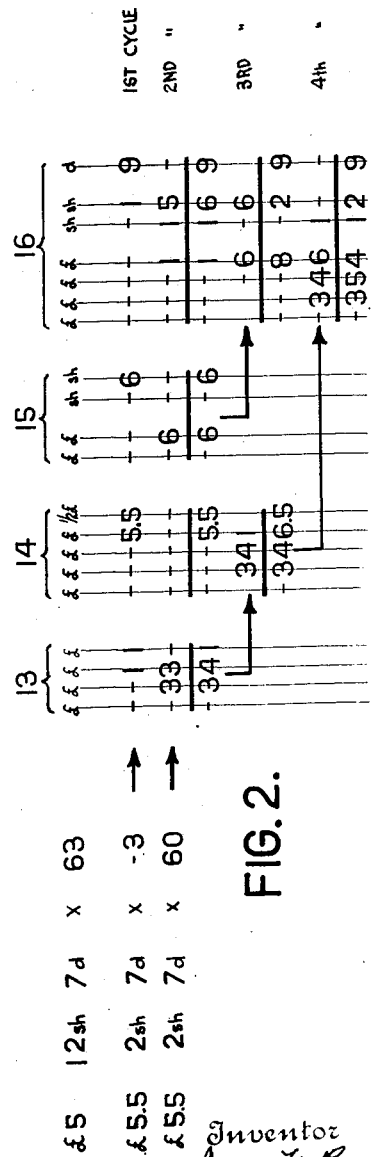

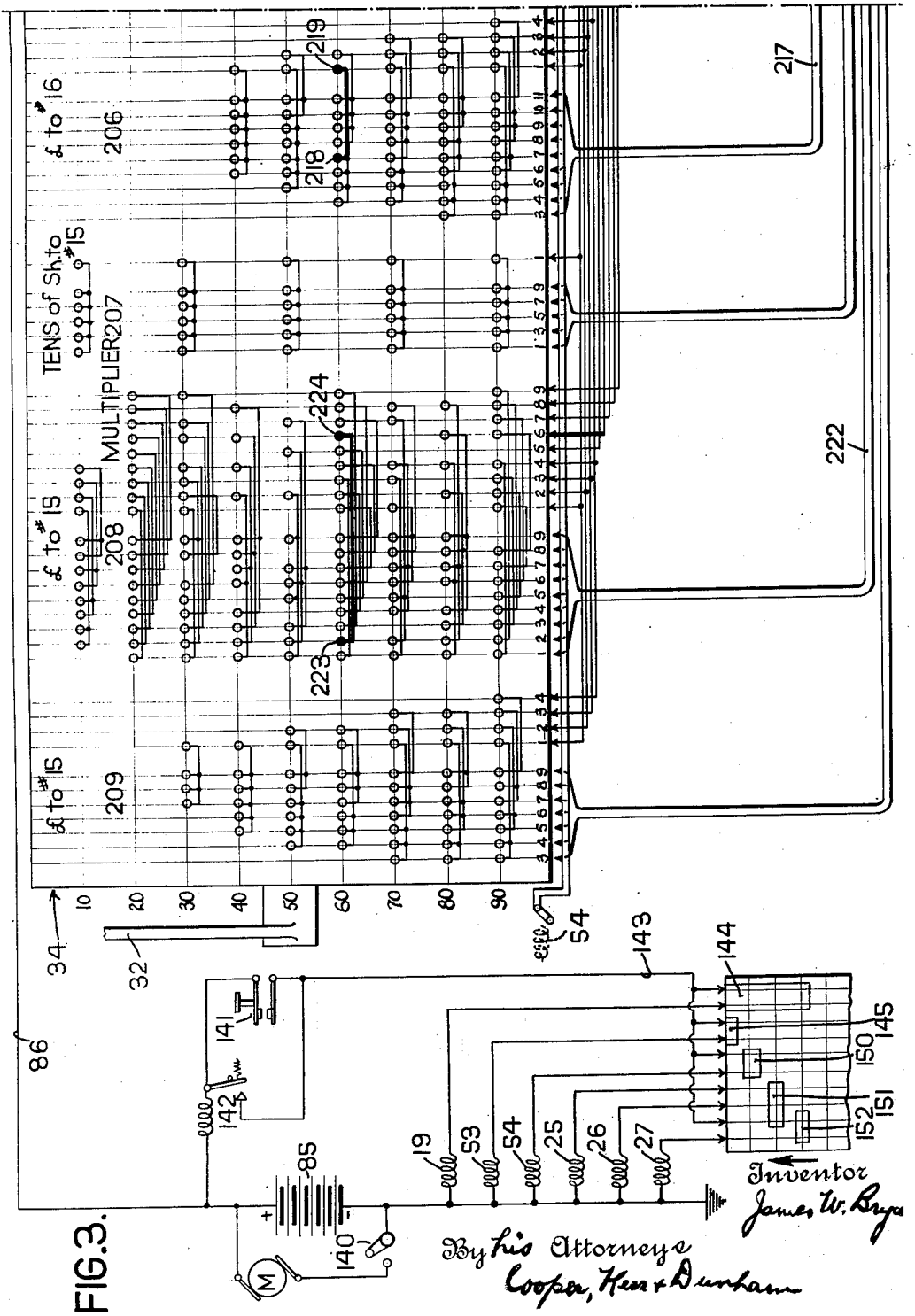

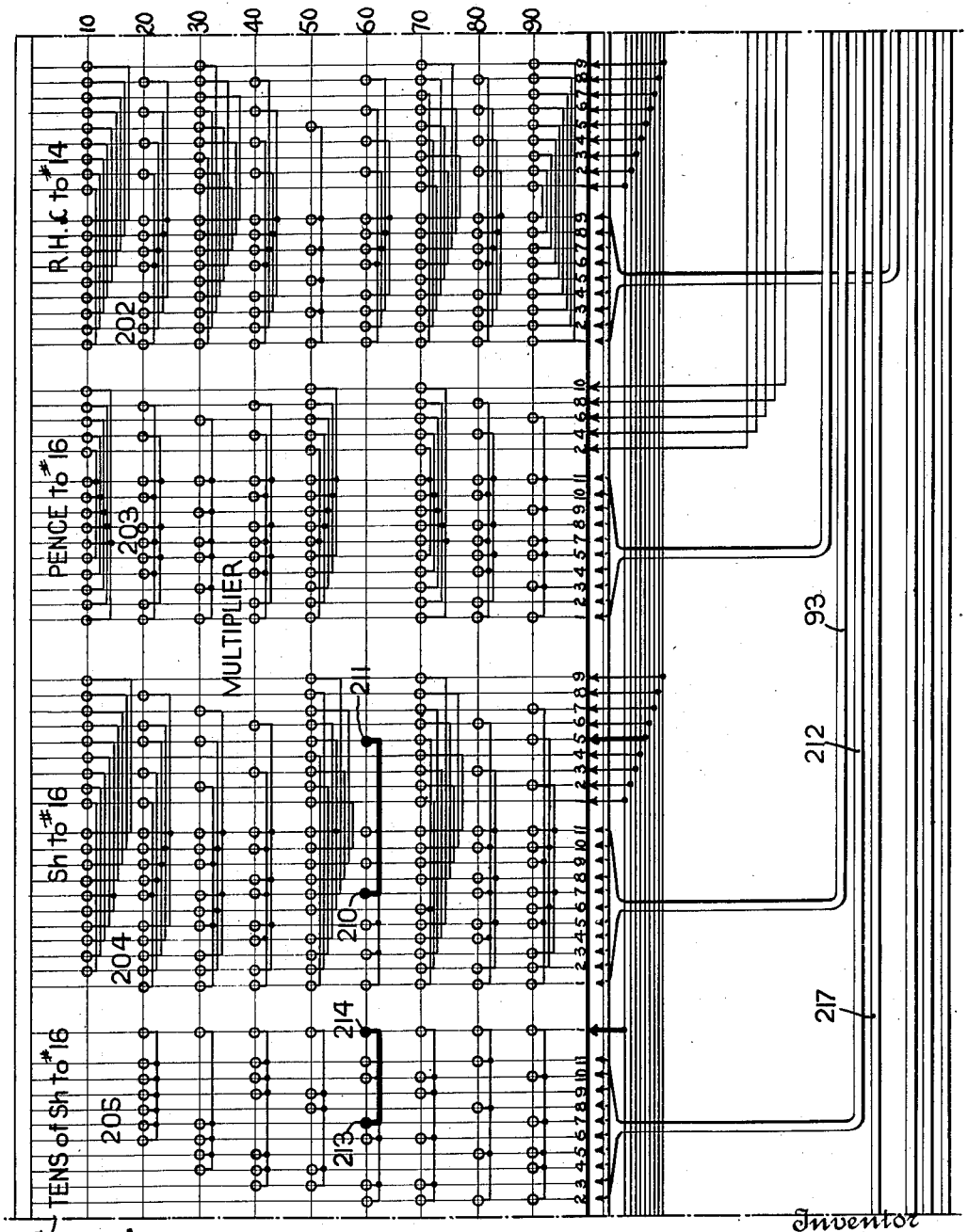

April 8, 1941.  J. W. BRYCE  2,237,335
MULTIPLYING MACHINE
Filed April 2, 1928   12 Sheets-Sheet 5

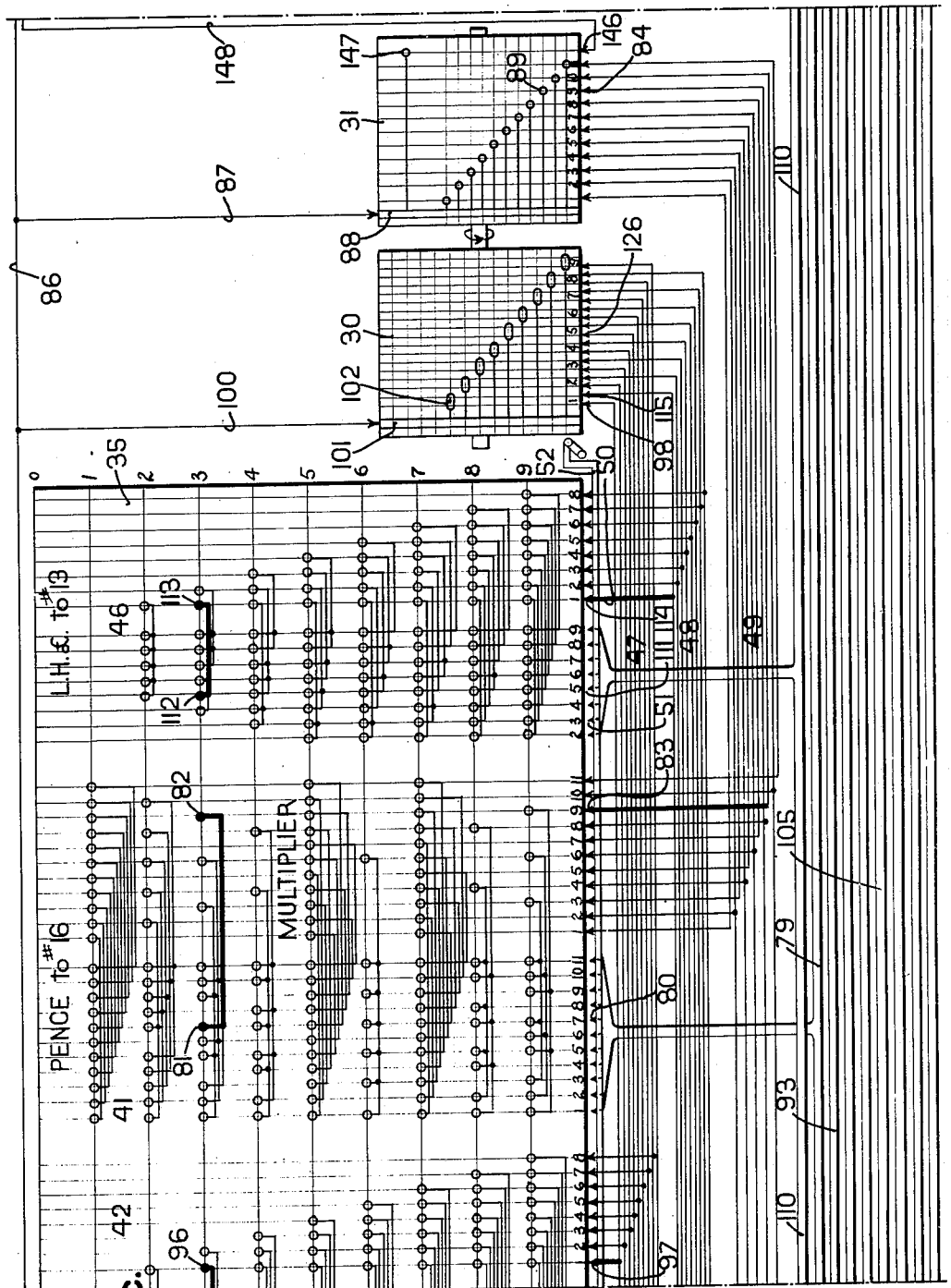

April 8, 1941.　　　　J. W. BRYCE　　　　2,237,335
MULTIPLYING MACHINE
Filed April 2, 1928　　　12 Sheets-Sheet 7

Inventor
James W. Bryce
By his Attorneys
Cooper, Kerr & Dunham

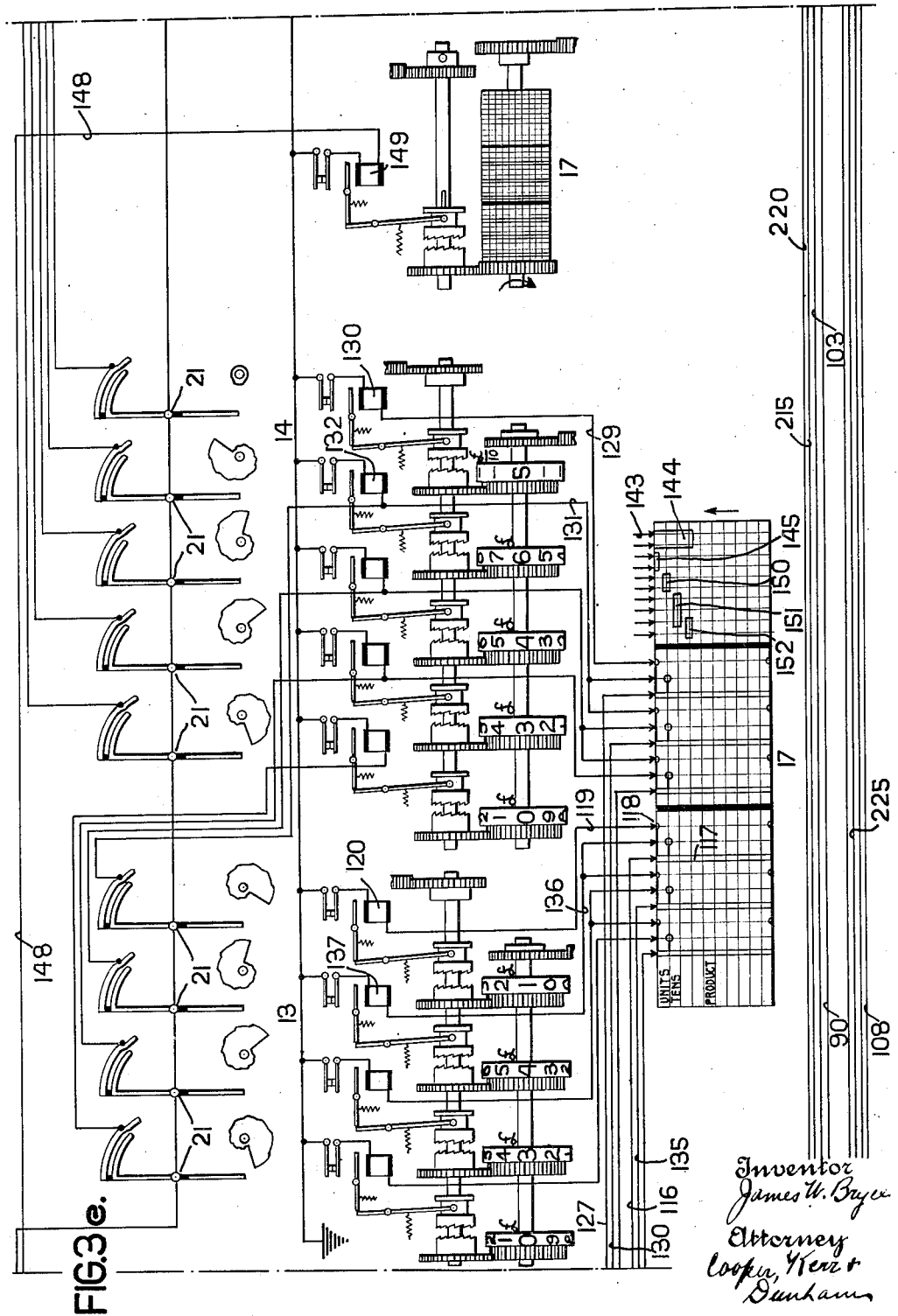

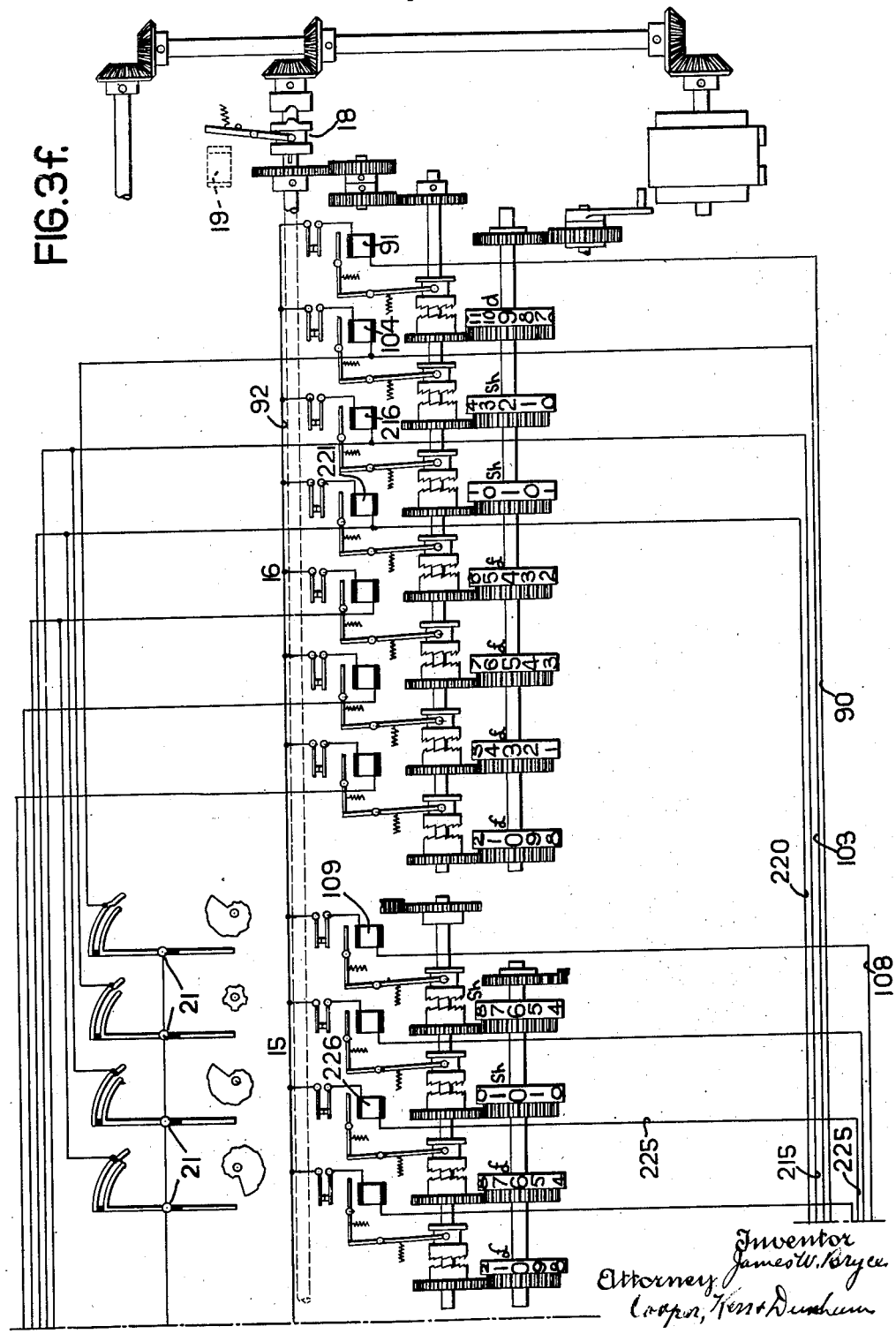

April 8, 1941.   J. W. BRYCE   2,237,335
MULTIPLYING MACHINE
Filed April 2, 1928   12 Sheets-Sheet 10

Inventor
James W. Bryce
By his Attorneys
Cooper, Kerr & Dunham

April 8, 1941.  J. W. BRYCE  2,237,335
MULTIPLYING MACHINE
Filed April 2, 1928  12 Sheets-Sheet 11
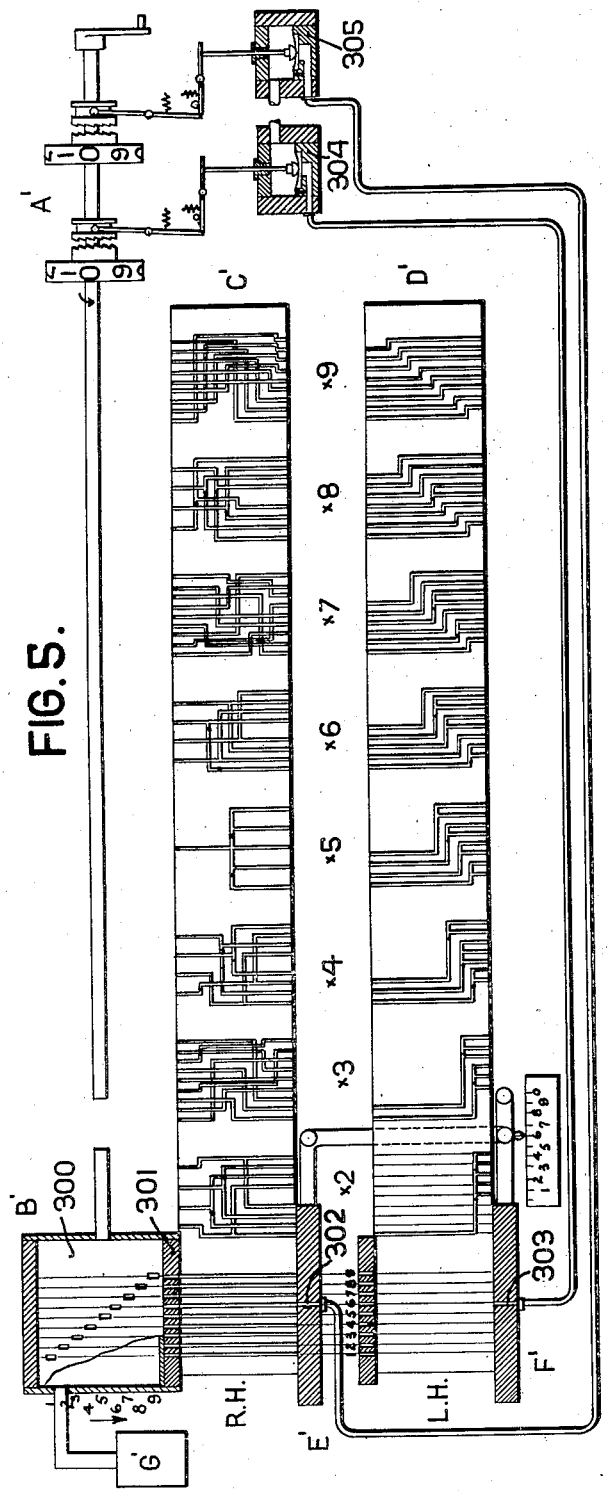
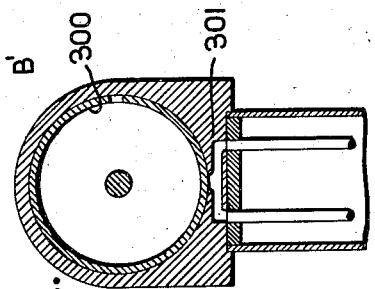
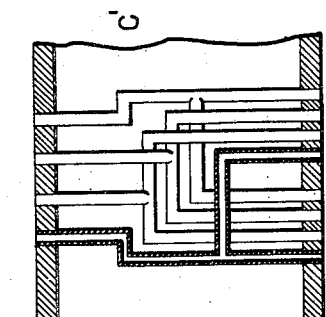
Inventor
James W. Bryce
Attorney
Cooper, Kent & Dunham

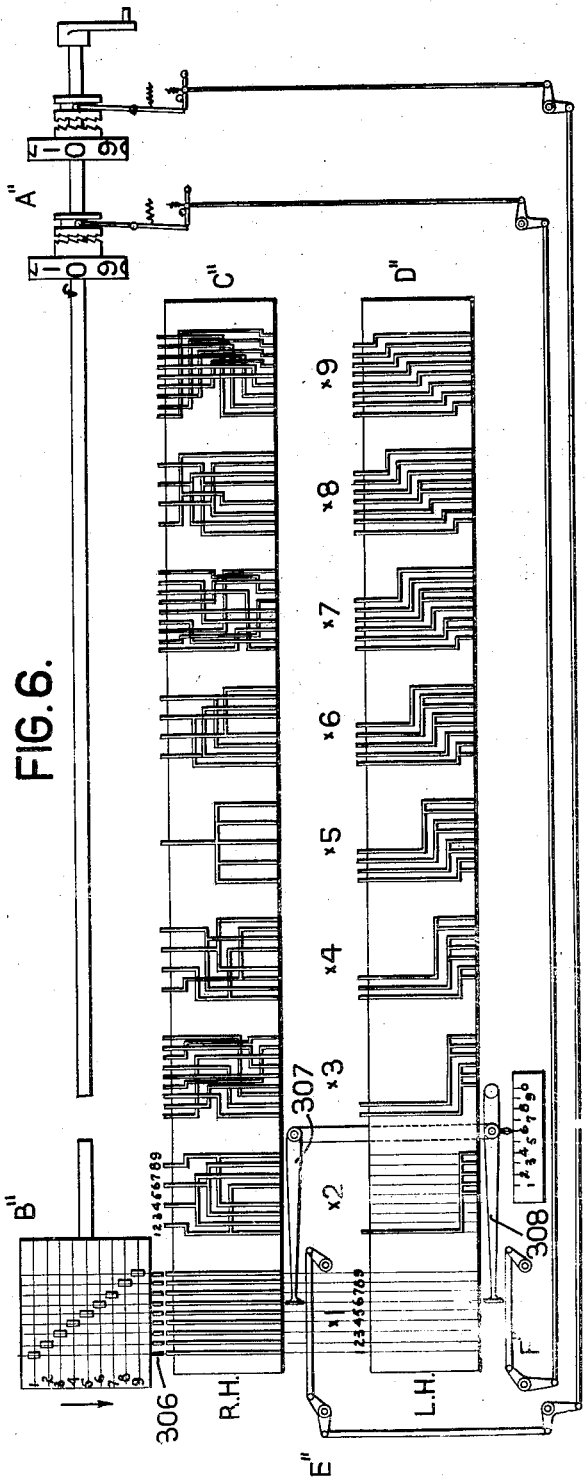
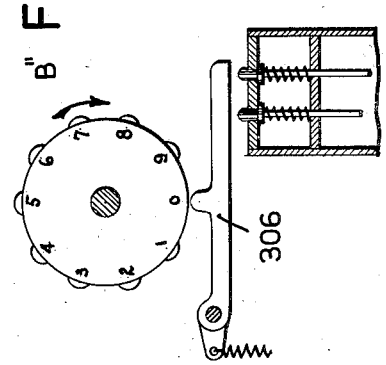
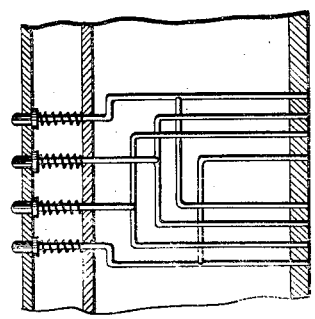

Patented Apr. 8, 1941

2,237,335

UNITED STATES PATENT OFFICE 2,237,335

MULTIPLYING MACHINE

James W. Bryce, Bloomfield, N. J., assignor, by mesne assignments, to International Business Machines Corporation, New York, N. Y., a corporation of New York Application April 2, 1928, Serial No. 266,762

20 Claims. (Cl. 235—61)

In the multiplying calculator art, multiplication by machines has been effected very much in the manner of the ordinary mental and written multiplying methods, that is, the operation begins with the entry of the multiplicand. In place of writing such amount previous machines have set up parts to in some manner represent the digital values in each of the denominations in the multiplicand. In accordance with the usual mental process or methods the entry of the second factor or multiplier now takes place. With machine multiplying, parts again are set up to represent the multiplier which may be a multi-denominational amount.

The next step is the carrying out of individual multiplying problems, that is, each denominational order of the multiplicand is multiplied by one of the digits of the multiplier and the results (i. e. the partial products) are set down and assembled together. This is done in machines by cooperatively associating the set parts which represent the factors and the operations are carried out step by step. Such steps are performed irrespective of the kind or manner of factor entry devices which are used.

The results are gathered together by the operation of the machine into a whole. In the case of larger problems the same procedure is followed. Whereas with mental or written computations all the steps of the individual digital multiplication are performed successively, some machines perform some steps concurrently thereby saving operating time, but the underlying principle of taking and separately computing each digit of the multiplicand and operating upon it by a digit of of the multiplier is followed.

All such machines utilize the static physical position or size of a part or parts to represent factors and results and having positioned these parts in accordance with the factors the physical set-up representations are read into the receiving device as results.

The following will illustrate the manner of computing of such machines:

$$6764 \times 8 = \underline{\begin{array}{r} 8682 \\ 4543 \end{array}}$$
$$54112$$

The 8 factor set-up works with the 4 to obtain the 2 and the 3 underlined above and then proceeds to operate with the 6 and so on. With such previous machines, it is to be noted that each pair of factors are separately handled. Furthermore the denominational values of the results flowing from such factors were determined immediately and at the beginning of the computing operation.

Before describing the present machine an explanation will be given of certain terminology to be hereinafter used. First, the term "notation" will be used to designate a group of numbers which have a significance as a group such as 0, 1, 2, 3, 4, 5, 6, 7, 8, 9, these being those used in the decimal notation. Similarly the group of numbers 0 to 11 inclusive, also comprise a notation for example that of the duo-decimal notation. Obviously, in mathematics there are other notations, for example in British currency where farthings are employed the notation is as follows: 0, 1, 2, 3. With yards, feet and inches since there are three feet in a yard, the notation is 0, 1, 2 and the inches again are in a duo-decimal notation of 0 to 11 inclusive. Accordingly, as hereinafter used, the term "notation" is used generally to define the group of numbers that are used in some particular kind of calculation and such notations may differ specifically one from the other. Duo-decimal notation is defined in Funk & Wagnalls dictionary as "Denoting or connected with the system of reckoning by twelves or a notation whose base is twelve." Obviously in mathematics there are other notations. While the machine herein described is adapted for use with the decimal and the duo-decimal notation, it also may be arranged for use with other notations.

According to the present invention a radically different procedure is followed which may be explained as follows:

The machine in place of separately handling the factors proceeds by working from the notation which is employed and establishing a progression correlated to one of the factors and constituting all of the results which can come from that factor taken with any other possible digits in the notation and in the remaining factor. Thus if 8 were the multiplier and with the machine operating with a decimal notation, the machine would form a progression as follows: 8—16—24—32—40—48—56—64 and 72. These amounts it will be noted, are an arithmetical progression based upon 8 and in their entirety constitute all the results which might be obtained by multiplying any of the digits of the notation by 8. Having established such progression wherein the denominational values of the terms are still undetermined, a selection is made from the terms of this progression. It is to be further noted that only one such progression will be formed regardless of the size of the multiplicand. The multiplicand entry then acts to select out of the already established progression a term or a number of terms or perhaps all or none of them according to the amount of the multiplicand.

In the example under consideration, while the entire progression of 8—16—24, etc., is available, the following terms only will be selected: 32—48 and 56. These selected terms are the ones representative of multiplying 4 and 8, 6 and 8, 7 and 8.

In the above computation the multiplication of 6 and 8 occurs twice. Accordingly, the multiplicand makes a selection of the 48 term from the progression and uses it twice and in doing this so effects an allocation of the denominational order values of 48 to properly enter such values into the receiving device. One of the 48's has a denominational value allocated to it of 48,000 and the other a denominational value of 480. Up to the point where the 48 was selected by the multiplicand, it had an abstract value of 48 and no denominational value whatsoever. The multiplicand similarly allocates values to the other selected terms, thus 56 has an allocated denominational value of 5600 and 32 remains as 32. These terms are now assembled in the receiving device thus:

```
   32
  480
 5600
48000
-----
54112
```

The machine furthermore, in creating and coordinating the progression, proceeds by first attempting to create a representation of all of the digit values of a notation or representations thereof wholly without regard of their denominational order or arrangement with respect to any problem that the machine is to compute. Thus with computations involving a decimal system of notation, the machine will create transient representations of the different digits, 1, 2, 3, 4, 5, 6, 7, 8 and 9. It is these transient representations which the machine is able to coordinate into a progression in accordance with one of the factors. The multiplicand device in selecting and allocating denominational values acts so that the transmission of the various representations derived from the progression into the receiving device takes place concurrently. In this way operating time is saved.

Summarizing according to the present invention computations are not derived from static physically set up and positioned result giving parts wherein denominational values are initially provided for. The machine starts with a transient representation of digits belonging to a notation, coordinates them into a transient progression and selects and allocates from said progression. The result is obtained only after the completion of the computing cycle and upon the transfer of the representation into the receiving device. Enroute thereto, the transient representations are wholly inchoate and intangible. Further, according to the present invention, problems are handled in a reverse manner to that ordinarily followed. The ultimate results are made potentially available and are developed by the computing cycle by coordination, selection, and denominational allocation, to be interpretable upon their entry into the receiving device.

By virtue of this novel law of operation, the machine which I have provided is relatively simple in construction and expeditiously handles more complex problems than heretofore.

Having set forth the underlying plan of operation of the machine, the present invention also more particularly relates to a calculating machine for effecting computations involving compound denominate numbers, for example, notations other than ten.

While the calculating machine is adapted to handle such compound denominate numbers it also is adapted to handle computations involving decimal notations as well. It is furthermore intended to handle such decimal notation computations concurrently with the handling of the compound denominate number computations. As an example of compound denominate number computations, those involving linear measures, such as yards, feet and inches, may be cited. Other compound denominate number computations are those involving British currency. British currency is based upon a duo-decimal system and in effecting computations involving multiplication of such currency, difficulty is experienced because of the lack of uniformity in the progression from one order to the next higher order. In effecting multiplying computations involving British currency it is necessary that not only straight multiplication be performed, but such computations also involve problems of divisions, addition of quotients and addition of the remainder quantities. Such involved operations have heretofore largely prevented the use of calculating machines in compound denominate number computations.

The present invention has for one of its objects the provision of a machine which will handle and compute problems of this general character.

A further object resides in the provision of a machine which will effect such computations more rapidly than heretofore.

A further object resides in the provision of a machine which will effect such a class of computations with simpler mechanism than has been known heretofore.

A further object resides in the provision of a machine of this class which is more reliable than previous machines which have only partially effected the functions herein attained.

Another object of the present invention resides in the provision of a machine for effecting computations of this class without requiring extremely skilled operators.

Another object of the present invention resides in the provision of a machine into which both factors of a to be performed computation may be entered. One factor may be in the form of compound denominate numbers, for example, one factor may represent British currency. After the factors have been introduced the machine is capable, without further skilled attention, of effecting multiplication and concurrently effecting operations which obviate the heretofore necessary subsequent attendant division operations. It will furthermore accumulate or gather together the products in their proper denominate orders including any products resulting from the multiplications of the whole numbers. The result which the machine then forms or displays will have its component numerals in the same numerical system as that of the originally introduced compound denominate quantity, and no conversion of this quantity is required. For example, in a British currency computation, if pounds, shillings and pence were multiplied by a whole number, the result would appear in pounds, shillings and pence, and no conversion of the quantity would be required, as it would be the true and correct ultimate product, based on the British system of currency.

The present invention has for its further objects among others, the following: the provision of a machine for concurrently handling computations involving numbers which include different notations; the provision of a machine which will give the result in the same notation or notations as that in which the problem is presented; the provision of a machine for automatically effecting compound denominate computations without any further manipulation other than entering the factors and starting the machine; the provision of a novel method of calculating; the provision of a novel method of calculating and a machine capable of carrying out such novel method, which includes one or more of the following features (1) the emission of differentially timed impulses (2) the coordination of such impulses into the notations employed in the calculation (3) the recoordination or further coordination of such impulses into a progression or number of progressions based upon one factor of the computation (4) the further selection or rejection of the impulses and the allocation of denominational values thereto of the selected impulses in accordance with the other factor of the computation (5) the entry of the computed values into receiving devices in proper columnar relation therein (6) the assembly of amounts from various receiving devices or registers into a unitary whole giving the final result of the computation and the final clearing of the machine to get it ready for a new computation.

A further object of the present invention resides in the provision of novel impulse emitting and coordinating means whereby simple emitting devices may be used for emitting the impulses which are to ultimately designate product amounts when received by the receiving devices, which impulses as initially emitted are wholly uncoordinated to denominational orders and to further provide for the denominational coordination of such impulses as they pass to the receiving devices.

A further object of the present invention resides in the provision of a machine and method of calculating including the creation of transient representations to represent the digits and the derivation therefrom of particular representations related to a computed result which are adapted to control a device to receive and evaluate and register in permanent form the result of the computation.

A further object resides in the provision of improvements in previously devised electrical calculating machines to the general end of simplification of such prior machines.

Other objects and advantages will be hereinafter set forth in the accompanying specification and claims and shown in the drawings which by way of illustration show a preferred embodiment of the invention.

Before describing the detailed construction and operation of the machine, it may be stated that use is made of registers for receiving and accumulating numerical amounts. The registers are of a type well known in the tabulating art and as here shown are adapted to be controlled by differentially timed impulses. The impulse emitting means are timed and coordinated to the cycle of the registers, such impulse emitting means being driven concurrently and synchronously with the registers. The factor entry means are intended to control the flow of the impulses from the emitter to the receiving means or registers. They control this flow in a variety of ways. They receive these impulses with no denominational orders allocated or assigned thereto. One factor entry means makes a general allocation and also selects or determines the progression or progressions desired and which take place during the cycle of the machine. The other factor entry means acts to reject all unwanted impulses and further acts to allocate to the selected impulses the denominational order of entry of the impulses into the receiving means or registers. The factor entry means conjointly operate to provide for an entry of a result into the receiving devices in a transposed form. For example, if 11 pence was multiplied by 91, the entry would not be 1001 pence but on the contrary it would be £4 3s. and 5. This is all effected before an entry reaches the receiving devices.

The factor entry means provide for a further peculiar function of coordinating the timed impulses from one of the emitters to two different denominational orders of the result and the final coordination of the destination of the impulses is determined by the other factor entry means.

The impulse emitters are furthermore coordinated in arrangement to the kind of notations which the machine is to handle but in certain instances when a given notation such as pence are being handled the decimal emitter acts to emit such impulses which are required to enter the decimal components of the result which are not in the pence notation. The denominational order of entry of such results is however, controlled by the pence selector. The general underlying principles of operation having been given, a further and more detailed explanation will now be set forth.

In the drawings,

Figures 1 and 1a, taken together show a perspective view of the complete machine.

Fig. 2 is an example of a multiplying computation as performed by the machine and illustrates the successive steps of operation of the machine which are required to obtain a product.

Figs. 3, 3a to 3f inclusive, taken together show a complete circuit diagram of the machine.

Fig. 5 is a showing of an equivalent embodiment wherein the action is carried out pneumatically.

Fig. 5a is a corresponding section, like Fig. 4a and

Fig. 5b is an enlarged detail of one part of the progression coordinator.

Fig. 6 is a similar and equivalent embodiment like Fig. 4, wherein the action is effected mechanically.

Fig. 6a is a similar detail view like Fig. 4a, and

Fig. 6b is an enlarged detail view of one part of the progression coordinator.

The machine in general comprises several separate sections which are coordinated for conjoint operation. For convenience in description, each of these sections or assemblies will be separately explained.

In general, the machine may be stated to comprise factor entry sections, one for the multiplier and one for the multiplicand.

While the invention is not limited to the particular factor entry means herein shown, such factor entry means as here disclosed, comprises a differential hand set-up type of entry means for the multiplier and a similar differential hand set-up entry means for the multiplicand.

It will be understood that if desired, other forms of factor entry means may be employed such as, for example, the card control factor entry means disclosed in my copending application, Serial No. 258,165, filed March 1, 1928, or for example, other kinds of factor entry means may be employed such as that shown in my copending application, Serial No. 248,315, filed January 21, 1928, or that shown in my copending application, Serial No. 244,594, filed January 5, 1928.

Figure 1:
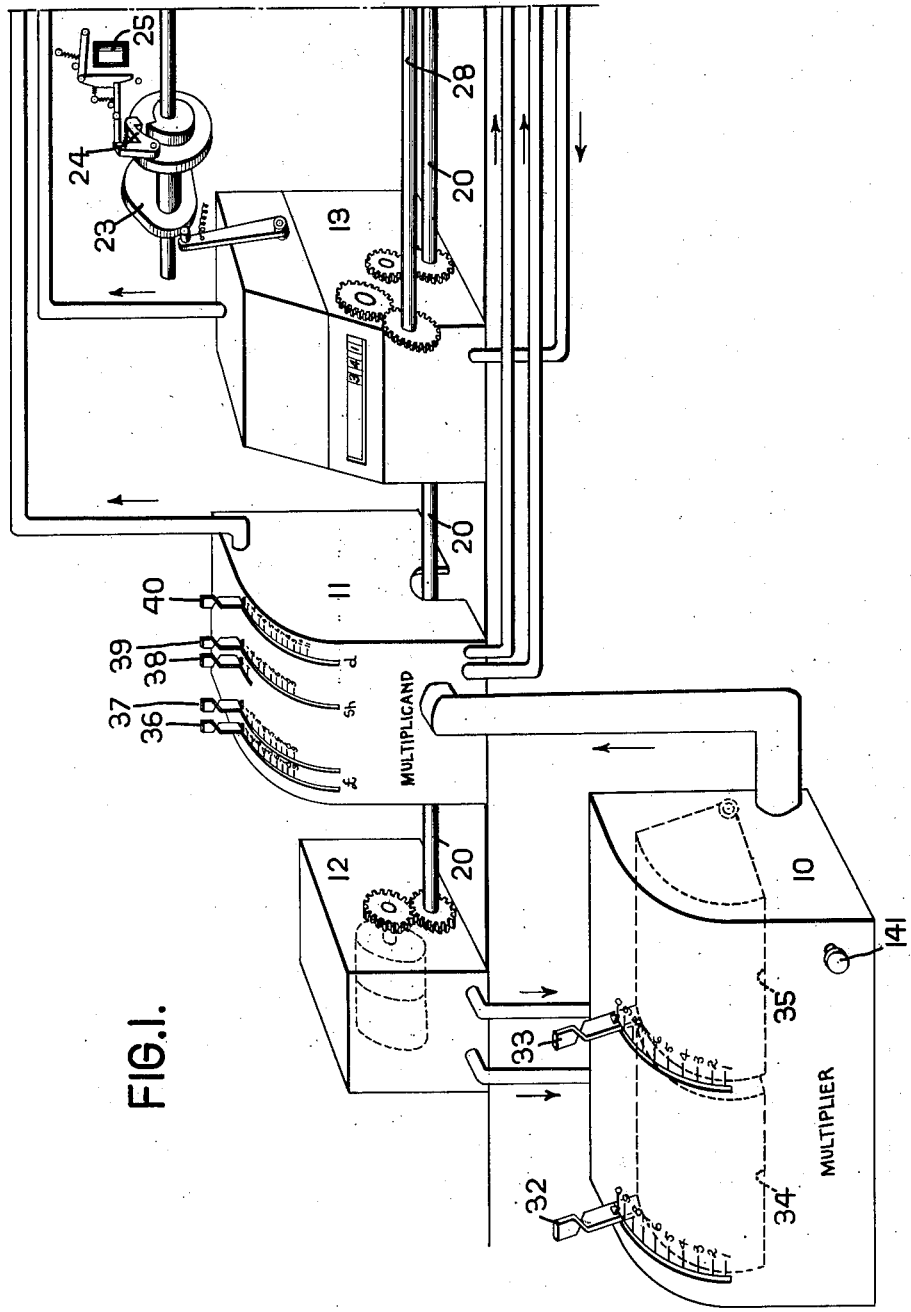

In Fig. 1, the multiplier entry means is shown at 10, and the multiplicand entry means is shown at 11.

The machine furthermore comprises an impulse emitting section generally shown at 12 in Fig. 1. This section of the machine emits all the impulses for all of the computations to be performed by the machine regardless of their ultimate denominational values or orders.

In order to rapidly gather together the various product computations as they are formed, multiple accumulating devices are provided. Certain of these accumulating devices, viz. 13, 14 and 15 in Figs. 1 and 1a, are of a type well known in the tabulating machine art and each comprise an electrically controlled accumulator of the well known Hollerith type provided with a reading-out means for reading out the amount standing on the accumulator. Each such accumulator 13, 14 or 15, with its correlated reading-out mechanism is of the type which is shown and fully described in Lake Reissue Patent No. 16,304, dated March 30, 1926.

Another accumulating means, generally designated 16, is also provided, which is also of the type well known in the art and may be the accumulator shown and described in Lake Patent No. 1,307,740, dated June 24, 1919. In its particular operation, this accumulator 16 is identical with the accumulators 13, 14 and 15, except that it is not provided with the top reading-out section inasmuch as the accumulator 16 is intended to display the ultimate product and does not require the product to be in any way derived therefrom by the operation of the machine.

Shaft 20 of the present application corresponds to the main counter drive shaft numbered 9 in Fig. 15 of Lake Reissue No. 16,304. This shaft is also shown unlettered in Fig. 17 of said patent. Re-set shaft 28 corresponds to shaft 71 shown in Fig. 2 of this Lake patent. In lieu of using a power re-set as in said patent, the re-set is here shown as by hand and such hand re-set is shown in Hollerith Patent No. 1,087,061. Note Fig. 2.

While this type of accumulator is here shown, it is obvious that a reading-out accumulator may be here employed in the event that it is desired to derive the product therefrom for recording elsewhere as in my copending application, Serial No. 258,165, filed March 1, 1928.

The next general section of the machine comprises the column shift controlling section, generally designated 17. This column shift mechanism is adapted to electrically divert certain of the impulses representing products and send the same to the proper sections or orders of the accumulators. It furthermore, is provided with certain sections for controlling the cyclic operation of the machine and indicating its operation status. Such column shift organization is of the general type shown in my copending application, Serial No. 248,315, filed January 21, 1928.

The machine also includes the usual operating parts which are generally similar to those employed in tabulating machines of the present time. These operating parts include a driving motor M which may be of the constantly running type. This motor is adapted to drive certain correlated driving connections and upon the actuation of a one revolution clutch 18, by and upon the energization of a magnet 19, this driving motor is adapted to drive the main drive shaft 20 of the apparatus. Each counter 13, 14 and 15 is provided with the usual read-out shaft 21 operated by a lever 22 in turn operated by cam 23. For each cam 23, a one revolution clutch 24 is provided and such various clutches are controlled by the energization of read-out magnets 25, 26 and 27. It will be understood that the read-out mechanism is also driven from the motor by the driving connections shown.

The machine also includes a reset shaft 28 which for simplicity of illustration is here shown as adapted to be reset by a crank 29. The reset shaft 28 is adapted to reset the accumulating devices 13, 14, 15 and 16 and also to reset the column shift mechanism 17. Such reset is effected in a conventional manner.

Before describing the detailed structure and operation of the machine, the problem involved in handling a multiplication wherein one factor is a compound denominate number will be first discussed.

Referring to Fig. 2 it will be assumed that the computation, which is to be performed, is one involving pounds, shillings and pence. For example, £5, 12s. and 7d. is to be multiplied by 63. In multiplying by 63, the computation is broken up into denominational order steps, i. e., the multiplication is first made by 3 in the units place and afterwards another computing cycle is used for multiplying by 6 in the tens place and so on. In multiplying 7d. by 3 the result is 21d. However, 21d. in reality is 1/9d. Accordingly, the machine automatically enters 1 and 9 into the accumulators.

When the shillings part of the computation is being performed, inasmuch as 20 shillings equal a pound and 10 shillings equal a half pound, the 10 shilling entry is taken as £.5 and is so handled in the computation. The shillings part of the computation, therefore, is 2 times 3 or 6 and this is so entered into the proper accumulator. The pounds part of the transaction which is now 5.5 is entered into the accumulator in its left and right hand components, viz. 5.5 in one accumulator and 11 in another accumulator.

Coming now to the multiplication by 60, 60 times 7d. equals 420d. This, however, is not entered as pence, but is entered as £1 and 15s. and no pence. 2s. times 60 equals 120s. or £6 and no shillings, and it is accordingly properly entered into the proper accumulator. The pounds 5.5 multiplied by 60 give a result of 33 in the left hand component and 0.0 in the right hand component.

On the computation diagram, the various computations are shown bracketed and these brackets are numbered with the corresponding reference numerals pertaining to the various accumulators.

Referring to the computation line marked "second cycle," it will be noted that the pence multiplication involves an entry of pounds and shillings. With another amount there might also be an entry of pence if there was a pence remainder. There is also an entry of pounds as a result of multiplying the shillings and with a different computation there is the possibility that both pounds and shillings would be entered. There is furthermore, a simple entry of pounds which is the result of multiplying pounds by a multiplier numeral. There are accordingly four distinct entries of pounds that may result from a multiplication. There are two separate entries of shillings that may result either into accumulator 15 or 16 and one possible entry of pence into accumulator 16.

In order to carry out a multiplication use is made of differentially timed impulses. The timing of such impulses is coordinated to the timing of the receiving devices. The impulses are primarily or potentially derived from the impulse emitter section 12.

Inasmuch as the computations to be performed may involve compound denominate numbers or different notations, i. e., a decimal notation and another notation according to twelves or other values, impulse emitting commutators or sections of a commutator are provided for each notation. With British currency two sections would suffice, one based upon a decimal notation and another based upon a duo-decimal notation. If farthings were handled as well no extra section need be provided nor for any other fractions involving a different notation which are factorily related to ten or twelve.

In the present embodiment where the computation has been carried out for pounds, shillings and pence, one impulse emitting commutator is provided for emitting timed impulses for all parts of the problem which relates to the decimal notations or any factors thereof, for example, pounds times any number, or shillings times any number or any other number that might occur in the decimal notation in the result and the other primary impulse emitting commutator would be related to the twelfths or duo-decimal part of the problem. Such emitting commutators are shown in the diagram view, Fig. 3c, 30 being the decimal emitter and 31 being the duo-decimal emitter. 30 is provided with nine spots and 31 with eleven spots because in this particular embodiment no zero impulse spot is required. These primary emitters are suitably geared as shown in Fig. 1, to rotate in unison with the main shaft 20 and with the receiving registers and in proper timed relation with respect thereto. The emitter 30 for the whole numbers would emit impulses at the proper times for controlling the true decimal number wheels of the register and the other emitter 31 is timed to emit impulses for controlling the duo-decimal wheels in the registering devices.

Multiplier set-up devices

The multiplier set-up device comprises two differential hand set-up levers 32 and 33 respectively, each of which when differentially displaced is adapted to differentially displace a corresponding segmental commutator or other equivalent switching device. Such commutators are respectively designated 34 and 35, similar reference numerals being used in Fig. 1 and in the diagram figures, Figs. 3, 3a, 3b and so on.

Multiplicand set-up devices

The multiplicand set-up device is provided with five set-up levers 36, 37, 38, 39 and 40, which levers in order represent the tens of pounds, pounds, tens of shillings, shillings and pence. The act of setting these levers 36 to 40 inclusive, or selected ones of them, sets up the multiplicand amount upon commutator devices shown in Fig. 3d. In this figure the amount of the multiplicand is shown actually set up on the respective commutators.

In the particular embodiment herein shown, the capacity of the machine is £99, 19s. and 11d. times 99. Obviously the capacity can be extended by the provision of additional setting up parts.

Referring again to the multiplier set-up device in the diagram figures, the segmental commutator is not shown in set-up position because of the confusion which would result in the drawings on account of cross wires, brushes, etc.

Figure 3B:
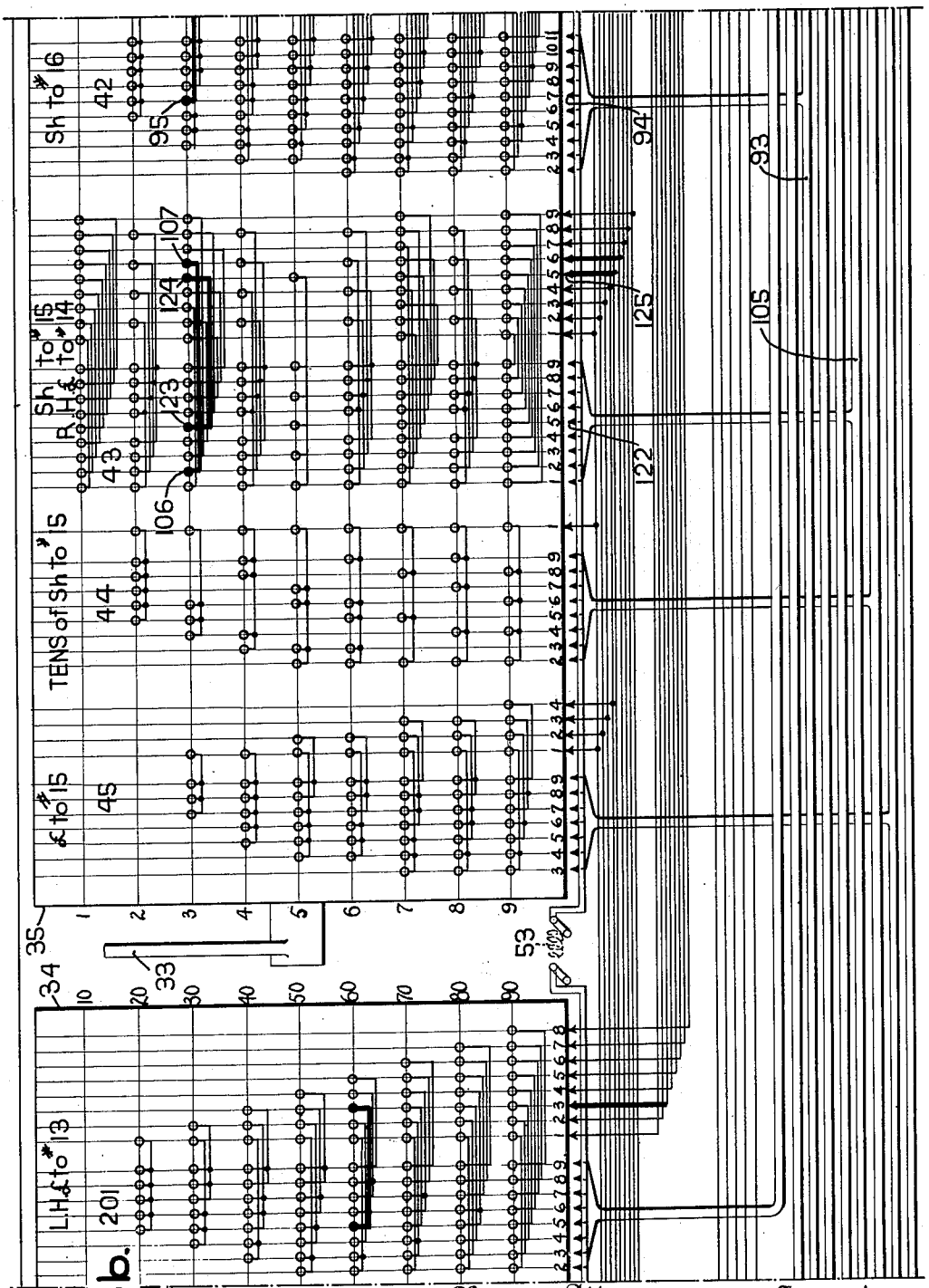

Referring now to Figs. 3b and 3c and specifically to commutator 35, which is the units multiplier set-up commutator, the setting lever 33 will have previously been displaced so as to render active all of the spots on the third line of such commutator. Such spots are in sections and are brought into alignment with the cooperating brushes shown at the bottom of the commutator.

It has been previously explained that with a pence multiplication there is a possibility of entry into accumulator 16 of pounds, shillings and pence, but when the computation involves a units multiplier the possibility of entry ends with shillings. For the units order of the multiplier, sections upon commutator 35 need only be provided for the entry of shillings and pence into accumulator 16. The section of commutator 35 generally designated 41 is the section which coordinates the connections from primary emitter 31 to transmit pence impulses into accumulator 16. Section 42 of commutator 35 is the section of the commutator which coordinates the transmittal of impulses from the primary emitter 30 into accumulator 16. This covers the zones or sections on commutator 35 which are provided for coordinating the transmission of shillings and pence impulses to the accumulator 16.

For handling computations involving units of shillings and units in the multiplier, section 43 of commutator 35 is provided. This section is adapted to correlate the transmission of shilling impulses to counter 15 and right hand components of pound impulses to accumulator 14. Section 44 of commutator 35 is provided for controlling and coordinating the transmission of tens of shilling impulses from the emitter 30 to register 15. Pounds may also be required to be transmitted from the shillings part of the computation. Accordingly section 45 is provided for this purpose which section controls and coordinates the transmission of impulses from commutator 30 to register 15. This completes the sections required for coordinating the transmission of impulses required resulting from the multiplication of shillings times units multipliers.

In multiplying pounds by units, a section designated 46 of commutator 35 is provided for coordinating the transmission of impulses from the emitter 30 to designate the left hand components of pounds into register 13. For controlling the coordination and transmission of right hand components of pounds the section 43 of the commutator is utilized. Such right hand components of pounds controlling impulses are transmitted into accumulator 14.

The general purpose of the commutator or switching devices 35 is to permit transmission from the primary emitters 30 and 31 as the case may be of controlling impulses which may be representative of the multiplication of the factor 3 by any possible multiplicand within the capacity of the machine. Of course, this is also true if the multiplier commutator is set on any other of the nine digits of the units place of the multiplier.

Having potentially available all such partial product representations, in the form of impulses, a multiplicand setting as will be later described, acts to select out and to permit the transmission to the receiving devices in the proper denominational orders thereof only such of these differential impulses which are representative of the particular problem under consideration. In other words, the setting of the multiplicand setting devices causes a rejection of all impulses except those related to a particular multiplicand number.

Summarizing, the primary emitters are potentially capable of emitting any impulses representative of any and all digits included in a given notation or notations. The multiplier set-up devices coordinates the transmission of such impulses in accordance with an arithmetical progression. For example, with a decimal notation computation and if the multiplier were the digit 3. The primary emitter would be potentially capable of emitting the following timed impulses 1, 2, 3, 4, 5, 6, 7, 8 and 9. The multiplier device would recoordinate such impulses to cause them to flow to the multiplicand selecting devices in a progression based on 3 as follows: 3, 6, 9, 12, 15, 18, 21, 24 and 27. In other words, a new progression is created or formed which is an arithmetical progression based upon the 3 multiplier. The multiplicand setting-up device then makes a selection from the foregoing progression and if 7 were the multiplicand the impulses representative of 21 would pass through to the receiving devices and all others would be rejected. If the multiplicand be such that more than two impulses be required to represent the product such necessary multiple impulses would flow and others would be rejected. Furthermore if pence were being handled in the multiplicand the selection above mentioned would still follow but there would be a further selection of impulses representative of shillings and the pence remainder, if any.

For example, take 7×3=21 pence. But inasmuch as the answer is required in shillings and pence, the impulses which would flow through the multiplicand devices are selected from the two emitters, so that 1 would flow to the shillings place and 9 to the pence place. Accordingly, the multiplicand device not only selects and rejects impulses but also determines the denominational order value of their entry into the receiving devices.

Referring again to Figs. 3b and 3c, three sets of bus feeding lines generally designated 47, 48 and 49 are provided. These bus feeding lines 47 and 48 extend to and have brush connections as shown with the primary emitter 30 and the lines or bus lines 49 extend to and have brush connections with the primary emitter 31. Groups of brushes are likewise connected to the bus feeding lines 47, 48 and 49 to direct the impulses to commutator 35, one group of brushes being provided for each section as shown. Such brushes are in maintained contact with the periphery of the commutator. The aforesaid group of brushes for feeding impulses into section 46 for example, are generally designated 50 in Fig. 3c. Other like and appropriate brushes are provided for the other sections 41 to 45 inclusive. Each section of commutator 35 is also provided with a cooperating set of out-going brushes, such set for the 46th section being generally designated 51. Such brushes unlike those heretofore described, are normally out of contact with the multiplier commutator, being carried by a suitable brush carrier member such as member or bar 52. The various outgoing brushes are adapted to be brought into contact with the commutator by the energization of a magnet 53. Magnet 53 brings the outgoing brushes of the right hand section 35 into contact therewith and another magnet 54, Fig. 3, brings the corresponding brushes on the left hand section into contact with commutator 34.

It will be assumed that commutator 35 has been displaced by the hand set-up device 33 to present the line marked 3 of the commutator 35 to the leading-in brushes and in alignment with the outgoing brushes.

Before describing the circuit connections through 35, it will be preferable to first consider the multiplicand set-up because such multiplicand set-up as previously explained has a controlling effect upon the emission of impulses from 35.

Figure 3D:
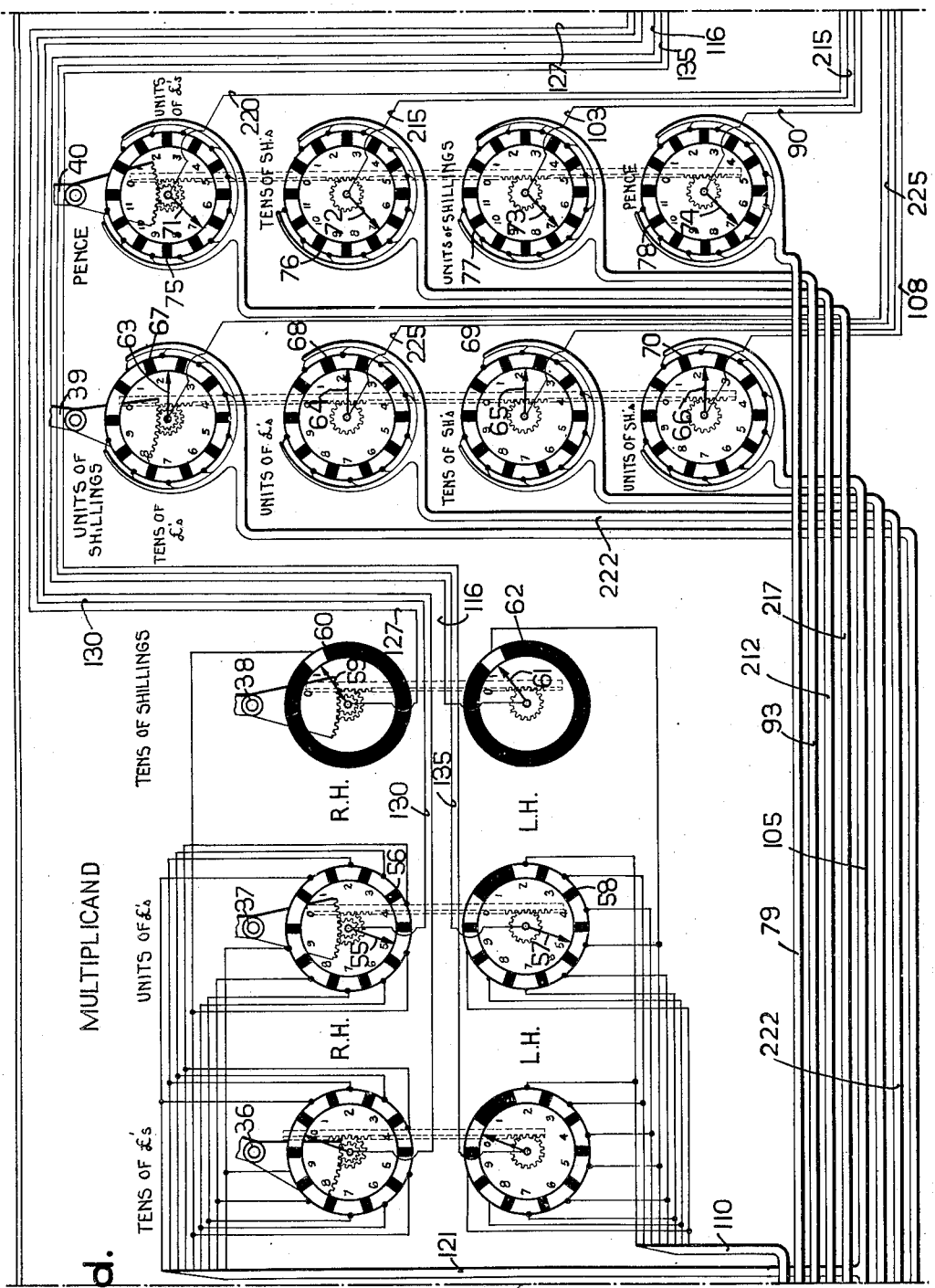

Referring now to Fig. 3d, the multiplicand set-up devices in this figure are shown with the problem shown in the example, Fig. 2, set up thereon. The units of pounds has set a brush 55 on the fifth spot of commutator 56 and has also set a brush 57 on the fifth spot of commutator 58. The setting device 38 has set a brush 59 on the one spot of commutator 60 and has also set a brush 61 on the one spot of commutator 62. The shilling set-up device 39 has set brushes 63, 64, 65 and 66 upon the spots marked 2 of commutators 67, 68, 69 and 70. The set-up device 40 has set brushes 71, 72, 73 and 74 on spots marked 7 of commutators 75, 76, 77 and 78.

Tracing back from brush 74, the spot 7 is in connection with the seventh wire of cable 79, which tracing through to Fig. 3c terminates at the seventh brush here marked 80. Due to the setting of commutator 35, this brush 80 is in contact with spot 81 which by suitable connections in the commutator is in electrical connection with the spot 82. Due to the position of the commutator, spot 82 is in electrical connection with the incoming brush marked 9, here marked 83.

Tracing the circuit connections from brush 83 through the ninth bus wire of group 49, this circuit will be found to terminate at the ninth brush cooperating with emitter 31 and here marked 84. Accordingly, upon the rotation of 31, an impulse at the index point position of the pence commutator will be transmitted from one side of the source 85, Fig. 3, through a wire 86, down wire 87, through a common conducting segment 88, through the spot 89 which is in electrical connection with the segment 88 by commutator wiring, thence out through brush 84 through the ninth wire of group 49, thence through brush 83, spot 82, to spot 81, thence out at brush 80 over the seventh wire in cable 79, seventh spot of commutator 78, through the brush 74 and out over a wire 90, which referring to Figs. 3e and 3f leads to the counter magnet 91 pertaining to the pence order of accumulator 16. Current flows back through a common wire 92 to ground and to the other side of source.

The above has completed the tracing of the forming and entering of 9 pence into the pence order of register 16, such 9 pence being the result of multiplying 7 pence by 3, it being the remainder of multiplying 7 pence by 3 and dividing by 12. The same computation also involves a shilling amount and the formation and entering of this shilling amount will now be traced.

Referring to Fig. 3d, brush 73 is on the 7 spot of commutator 77 which spot is connected to the seventh wire in cable 93, which extends over (Fig. 3b) to the seventh brush here marked 94, which due to the position of commutator 35, is disposed on spot 95. Such spot 95 by the commutator wiring is electrically connected to spot 96, which spot is electrically connected with the number 1 brush here marked 97. Such brush is electrically connected to the number 1 wire of the bus 47 which extends to the number 1 brush here marked 98, cooperating with the primary emitter 30. By and upon the rotation of the primary emitter 30 at the one index point in the operation cycle, current will flow from line 86 through wire 100, common ring 101, thence to the one spot here designated 102 out over brush 98 over the number 1 wire of bus 47 over brush 97, through spot 96 to spot 95, thence out over the seventh brush designated 94 to the seventh wire in cable 93, back through this wire to the seventh spot of commutator 77 through brush 73 and out over wire 103, Figs. 3d, 3e and 3f to counter magnet 104 pertaining to the units of shillings order of register 16 and back through wire 92 and ground to source. This has completed the entry of the multiplication of 7 pence times 3 into the proper shillings and pence orders of register 16.

The multiplication of two shillings times 3 will now be traced. Brush 66 (Fig. 3d) is on the 2 spot of commutator 70 connecting to the second wire in cable 105 which leads to the number 2 incoming brush on section 43 (Fig. 3b), which brush is on spot 106 which by the wiring of the commutator is connected to spot 107. This spot being in electrical connection with the number 6 outgoing brush which in turn is connected to the sixth wire of the bus group 47 leading to the sixth brush of the primary emitter 30. In the rotation of the primary emitter as before, an impulse will flow from the emitter through the sixth spot and the sixth brush back through the circuit previously traced and spots 107 and 106 out over the second brush to the second wire of cable 105 and through this wire to commutator 70 and via brush 66 to outgoing wire 108, which wire 108 leads to the counter magnet 109 pertaining to the units of shillings wheel of accumulator 15. In this way 6 is entered in this accumulator which represents the product of 3 times 2 shillings.

As previously explained the tens of shillings are considered as £.5. The tracing of this part of the computation will now be made. Setting devices 38 (Fig. 3d) will have placed brush 61 on the one spot of commutator 62 which spot is connected to the number 5 wire in cable 110 (Fig. 3d). This fifth wire extends through to brush 111 which is in contact with spot 112 of section 46 (Fig. 3c), which by the commutator wiring extends to spot 113, which spot is in cooperation with the number 1 brush 114, said brush being connected through the proper wire of bus 48 to the number 1 brush 115 cooperating with primary emitter 30. Upon the rotation of this emitter at the one index point position an impulse will flow out from it over 115, thence through 114, 113, 112, 111 back over fifth wire of cable 110 back through brush 61 and wire 116, ring 117 of column shift device generally designated 17, thence out via spot 118, wire 119, to counter magnet 120 of counter 13 and back to source via ground. This has entered into register 13 the left hand component of the multiplication of point 5 times 3 (i. e. 3 times 5 equals 1.5, one being the left hand component). This same computation, however, involves a right hand component, viz. 0.5. Accordingly, brush 59 (Fig. 3d), which is on its spot marked 1 of commutator 60, is in connection with the fifth wire of cable 121 which cable is joined to cable 105 so that the fifth wire of it connects to the fifth wire of 105. Through this fifth wire a circuit is established through the fifth brush marked 122 (Fig. 3b) which brush is on spot 123 electrically connected to spot 124, which also connects to the number 5 brush here marked 125 and through it connected to the fifth wire of the 47 groups of buses and to the fifth brush 126 cooperating with primary emitter 30. Upon the rotation of this emitter at the 5th index point, an impulse will be directed through 126, 125, 124, 123 and 122 over the fifth wire in cable 105, the fifth wire in branch cable 121 back through brush 59 to a wire 127 which through the column shift device is directed to a wire 129 to the counter magnet 130 pertaining to the five tenths wheel of accumulator 14. In reality 5 is added on this wheel, but being in the tenths denominational order, its value is actually £.5.

The above has completed the tracing of the multiplication of tens of shillings by 3, giving the result of £1.5.

Tracing now the multiplication of £5 times 3. The primary emitter 30 at its fifth index point in its cycle will direct an impulse over the fifth wire of bus 47 to the brush 125, spot 124, 123, wire 5 of cable 105, brush 122, back to the fifth wire of branch cable 121, through up the fifth spot of commutator 56 through brush 55 over wire 130 through the column shift device to wire 131, magnet 132 and back to source. Energization of 132 enters 5 on the units of pounds wheel of accumulator 14. This is the right hand component of the multiplication of £5 times 3.

To form and enter the left hand component, an impulse is emitted at the one index point position by the emitter 30 over the number 1 brush 115, back through brush 114, spot 113, spot 112, brush 111, fifth wire of cable 110 to the fifth spot of commutator 58, thence via brush 57, wire 135, through the column shift device to wire 136 and to counter magnet 137 adding one on the next higher order wheel of accumulator 13. This has completed the entry of the left hand component of the multiplication of 3 times £5.

The above tracing of circuits and cycle has completed the entry of amounts shown in Fig. 2 opposite the line marked "first cycle." In other words, £5, 12s. and 7d. has been multiplied by 3 and their individual products have been entered into the respective accumulators 13, 14, 15 and 16.

The foregoing description has assumed that the various brushes cooperating with the commutator 35 which are normally out of contact therewith have been raised into contact and that a computing cycle is in process.

The manner in which the brushes are brought up into contact with commutator 35 and the method of bringing about the first computing cycle will now be described.

Referring to Fig. 3, the motor M is shown with a suitable switch 140 which is first closed to put the motor in operation. There is further provided a start key 141 with a relay 142. After the motor is in operation, closure of the start key energizes relay 142, current flowing down line 143 and through a conducting segment 144 which constitutes part of a commutator associated with and movable with the column shift device 17 (see Fig. 3e). Current flows back through magnet 19 from segment 144 to source and this actuates the main clutch 18 (Fig. 1a) so that the main shaft 20 of the device is rotated. Current flow is maintained in the circuit after the start key is released by the relay 142. A further conducting segment 145 is provided adapted to permit current to flow up through magnet 53 and back to source. This energization of this magnet 53 attracts the brushes to the commutator 35 as previously described. The first cycle now takes place and in this cycle the amounts as shown in Fig. 2 are concurrently entered in to the various registers 13 to 16 inclusive in the manner previously described. Toward the end of the first computing cycle a special brush 146 (Fig. 3c) encounters a spot 147 on commutator 31, and allows current to flow from source through line 87, 146, 147, line 148 to a clutch magnet 149 pertaining to the column shift commutator. The column shift commutator generally designated 17 is then advanced one increment or step of movement. This advancing action not only effects the column shift selection by the column shift portion of this commutator, but it also breaks the circuit to magnet 53 and establishes a circuit to magnet 54 by a conducting segment 150 (Fig. 3). Magnet 53 having been de-energized the various groups of brushes cooperating with commutator 35 drop away from cooperation with that commutator and the energization of magnet 54 brings up corresponding brushes into cooperation with commutator 34. The machine is now ready for the second computing cycle in which £5, 12s. and 7d. are to be multiplied by 60 or 6 in the tens place.

Before describing the ensuing second computing cycle it may be explained that in the third cycle provision is made for transferring the amounts from accumulator 13 into accumulator 14 and for also transferring the amounts from the accumulator 15 into accumulator 16 and on the fourth cycle the amounts then standing on accumulator 14 are transferred into accumulator 16 to give the final and complete product. Such transfer of amounts is effected automatically under the control of segment spots 151 (Fig. 3) and 152 which in proper cyclic time energize magnets 25 and 26 and subsequently magnet 27 (Figs. 1, 1a and 3). The energization of these magnets actuates the respective reading-out mechanisms 22, 21 of the various registers and causes the amounts derived from the registers to be entered into the correlated other registers. Such transfer of readings is fully described in my British Patent No. 304,599 of 1929.

The commutator 34, it will be remembered has been shifted so that its 60 line is in cooperation with the leading in and out brushes. The multiplication of 7d. times 60 will now be traced. In this case the multiplication produced a result of £1 and 15s. and no pence, for this reason there is no use in tracing from brush 74 (Fig. 3d) back to the multiplier commutator because the result will be ultimately zero and there will be no impulse imparted to the pence register wheel. Commutator 34 has a number of sections 201, 202, 203, 204, 205, 206, 207, 208 and 209. By referring to section 203, it will be noted that the 60 line at this point is wholly blank so that no impulses are transmitted to the pence column when multiplying by an amount of 6 in the tens place.

Tracing now back from brush 73 (Fig. 3d) this brush is on the seventh spot connected to the seventh line of cable 93, which extends to the seventh brush, which brush is now in cooperation with spot 210 which spot is electrically connected to spot 211, which in turn is in contact with the fifth brush connected to fifth wire of the group of buses 47. This bus wire derives a differentially timed impulse at the 5th index point position from the emitter 30 and transmits at the 5th index point in the cycle such impulse through the circuit just traced back to brush 73, on Fig. 3d. The impulse then flows from this brush over wire 103 to counter magnet 104 (Fig. 3f), thus adding 5 shillings on the proper wheel of accumulator 16. This introduces 5 shillings in the counter 16. Bush 72 (Fig. 3d) is in contact with the 7 spot and connects with the seventh line in cable 212 which extends to the brush 7 on section 205 and through spots 213 and 214 connects with the number 1 brush associated with the bus 47. This will transmit an impulse at the 1 index point position back over the circuit just traced through brush 72 over wire 215 (Figs. 3d, 3e and 3f) and energize magnet 216 entering one tens of shillings into counter 16.

The above has completed the entry of the shilling component and the one pound component entry will now be traced.

Brush 71 is in electrical connection with the seventh wire of cable 217 which extends to section 206 and through the seventh brush which connects to spot 218 connected to 219, thence back via brush 1 and the one line of the bus 47 to the primary emitter 30. This emitter over the circuit thus traced, emits an impulse at the one index point position back over the circuit thus traced through wire 220 (Figs. 3d, 3e and 3f) to the counter magnet 221, thereby enters one pound into the proper wheel of register 16.

The above has completed the tracing of the entry of 7d. times 60 into the proper pound and shillings wheels of the respective registers.

The tracing of the circuits for the multiplication of 60 times 2 shillings will now be made. Brush 64 (Fig. 3d) is on the 2 spot of commutator 68 connecting to the second line of cable 222 which extends to section 208. Tracing up from the number 2 brush this brush will be in cooperation with spot 223, electrically connected to spot 224, which is in connection with the 6 brush of bus 47 leading to the primary emitter 30. At the 6th index point position an impulse will be transmitted through the circuit just traced, through brush 64, to a wire 225 (Fig. 3d), which leads to the counter magnet 226 and thus enters £6 into the proper wheel of register 15. In this particular computation no tens of pounds or shillings are emitted. Consequently, such circuits need not be traced. The tracing of the impulses for the multiplication of £5.5 times 60 need not be traced in detail. It is sufficient to state that the action is substantially the same as before except that the column shift commutator, generally dr ignated 17, will have advanced one step at the end of the last or first computating cycle so that the entries are relatively entered into the registers 13 and 14 in the next relatively higher order of wheels. With the computation herein illustrated, no entry is made into register 14 because the right hand components are zero. It is obvious that this explanation can be indefinitely extended to include other computations, but the principle of the machine has been fully set forth in connection with the illustrated example.

The machine can be obviously extended for further orders in the multiplier and additional capacity in the multiplicand. After the computation has been completed, the machine comes to rest with the ultimate product in register 16. Termination of all computing cycles is effected by the de-energization of magnet 19 by the rotation of the column shift commutator 17. This will act to de-energize magnet 19 and the relay 142, causing all parts except the main driving motor, to come to rest. Thereafter the operator resets the various parts by turning the reset crank 29, which acts to reset all of the accumulators and the column shift device and to put the machine in condition for a new computation.

With further reference to section 43 of commutator 35 (Fig. 3b) the following is to be noted. This section is adapted to coordinate the emission of right hand components of pounds controlling impulses and to also coordinate and control the emission of shillings impulses. Both of the progressions here involved employ a decimal notation. Accordingly, so far as this section is concerned, it is immaterial whether an impulse represents pounds or shillings, it is only necessary that it pertain to a decimal notation.

Referring again to Fig. 3a, with particular reference to section 204 of commutator 34, this section will be found to be controlled upon a duo decimal notation (note the brushes numbered 1 to 11). The emitter which cooperates with this section is, however, the tens emitter 30.

With further reference to Fig. 3d, it is to be noted that an impulse coordinated to represent 5 in a progression and coming from the multiplier coordinating commutator, can alternatively represent £5 or £0.5 or even higher denominations. The ultimate denominational value of the amount is controlled by the multiplicand commutators and also by the column shift device 17. A single impulse representative of 5 by its timing, coming from the 5th line of cable 121 for example, may even finally become 5 in the tens place of pounds, 5 in the units place of pounds and 5 in the tenths of pounds place. It can become each or all or any of the above values.

With reference to the column shift device 17 and associated parts, as diagrammatically illustrated, the commutator in its developed form, is indicated as having a direction of rotation as shown by the arrows, Figs. 3 and 3e. The gearing delineated to the right in Fig. 3e, rotates the commutator in reverse direction as indicated by the arrow. The relative difference of rotation is immaterial and the direction of rotation given in the developed layout is used because if the opposite direction of rotation were employed, the complication ensuing in the wiring diagram would detract from its clearness.

The various sections of the multiplier commutators 34 and 35 have been labelled to show the impulses coordinated and flowing therefrom and in accordance with the progression which the commutators establish and in accordance with the register destination of the impulses from the respective sections. The legends furthermore show whether the impulses are for representing right or left hand components of results, i. e. R, H, or L, H.

The multiplicand selectors are shown in Fig. 3d and are further labelled to show first their relative denominational value with respect to an entered amount, i. e. tens of pounds, units of pounds, tens of shillings, units of shillings and pence. The three left hand devices are further labelled LH and RH to show which select left or right hand components of the result. The two right hand devices are labelled individually with the relative values which are selected thereby. On the shillings device, the top commutator selects tens of pounds, the next units of pounds, the next lower tens of shillings, the next units of shillings. The pence devices are respectively labelled units of pounds, tens of shillings, units of shillings and pence. These legends, it is to be noted, pertain to result amounts which are entered into the receiving devices.

Figure 4:
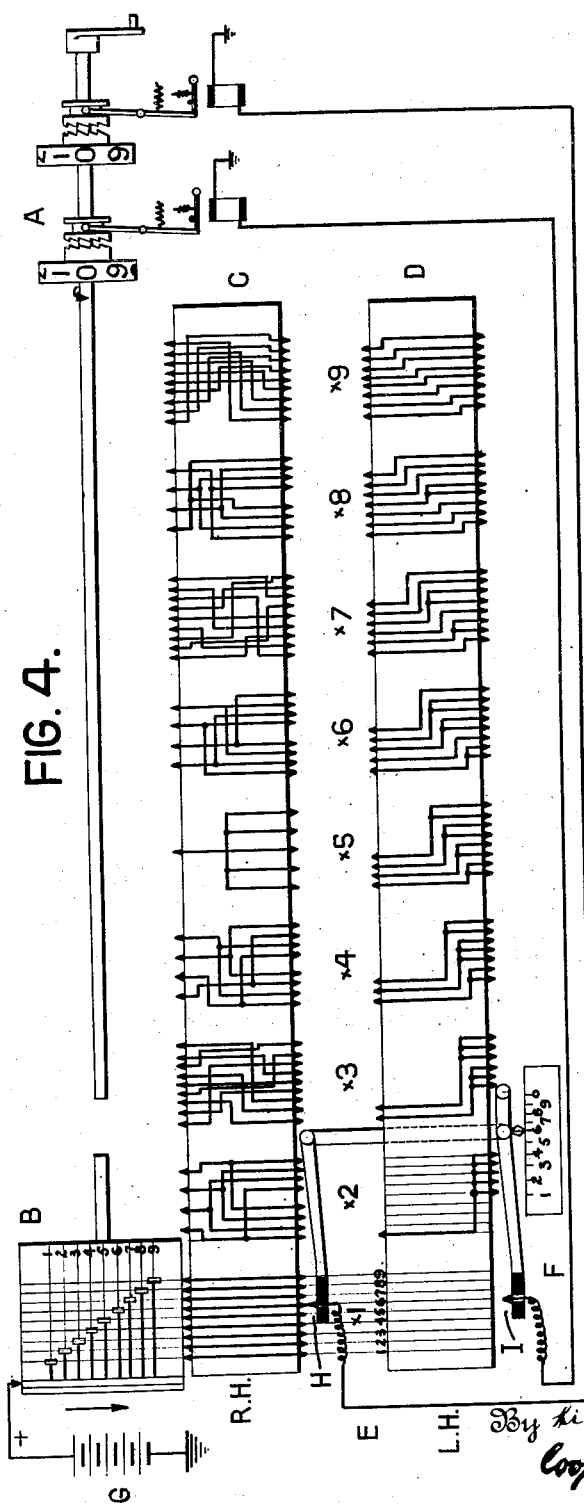
Fig. 4 is a diagrammatic view showing the underlying features of the present invention in an electrical embodiment.
Figure 4A:
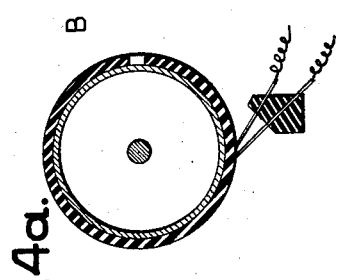
Fig. 4a is a detail section of the impulse emitter showing its cooperation with the progression coordinator for the right hand and left hand components which are disposed back of each other as shown in this figure, but which in Fig. 4, for clarity of illustration, are shown one under the other.

Having described in detail the preferred electrical embodiment of the invention, the underlying principles of operation involved in the present machine and the manner of alternatively effecting computations electrically, mechanically or pneumatically by the method of calculating herein set forth can be understood from Figs. 4, 5 and 6, which show equivalent ways of effecting computations electrically, pneumatically and mechanically.

In Fig. 4, the receiving device or register is generally indicated at A. The impulse emitter or transient representation creator for the digits of a notation is shown at B. The progression coordinator for coordinating the representations into a progression based upon the multiplier, is shown at C and D. The selector for selecting the other factor of the computation and allocating denominational orders to the transient representations is shown at E and F.

In the electrical embodiment the emitter B is operated in timed relation with the drive shaft for the receiving device A and comprises a commutator. The progression selector C—D, it being understood that D is disposed directly back of C, comprises a number of sections, one allocated to each possible digital value of the multiplier. The progression selector may be selectively placed so that any section will be in cooperation with the impulse emitter B.

In Fig. 4 the progression coordinator is placed with the one section in cooperation with the emitter B. The multiplicand selector E—F is shown as selectively disposed opposite 6.

As the emitter B rotates in times relation with the drive of the receiving device A when the 6th index point on its commutator is reached, an impulse will be created coming from the source of current G, which will flow through the sixth spot on the commutator of B and thence out through the brushes pertaining to the one section of the progression coordinator, through the wiring of the progression coordinator pertaining to that section, thence via the brushes H and I which pertain to the multiplicand. These brushes will select from the transient progression of representations passing through the progression coordinator and will allow the sixth impulse only to pass to the right hand column of the receiving device and actuate the receiving device magnet entering the number 6 into the receiving device. The result will be that 0 6 will be displayed on the receiving device A which represents the result of the computation of 1×6.

It will be understood that the progression coordinator comprises wiring or circuits for the respective sections so that the potential transient impulses received from B are formed into a progression based upon the multiplier. For example, if the multiplier was 5, the fifth section of the coordinator would allow outgoing impulse representations to pass through, representing 5, 10, 15, 20, 25, 30, 35, 40 and 45. From such progression of transient representations the multiplicand selector E and F would select out and allow to flow to the receiving devices only such impulses or representations which are necessary to show the product of 5, times whatever multiplicand number was used. For example, if 6 were the multiplicand, the transient representations or impulses which would flow to the receiving devices would be 30, 3 going to the left hand register wheel and 0 to the right hand.

In the pneumatic embodiment, the impulse emitter or transient digit representation creator, generally designated B' comprises an inner shell 300 having parts or openings suitably positioned to permit the flow of compressed air from a chamber or reservoir G'. The ports in the inner member 300 successively come in line and uncover and open a passage for the flow of compressed air through relatively fixed ports 301 in the shell member within which the emitter ported member 300 operates.

The progression coordinator C' and D' in place of having various electrical progression coordinating circuits as in the electrical embodiment is provided with equivalent ducts. The multiplicand selector E' and F' comprises a single port or duct 302 for the right hand components and 303 for the left hand component. This multiplicand selector is selectably adjusted to bring these ports into alignment with the proper duct coordinated with C' and D'. The air flows through the duct connected with the ports 302 to 303 to pneumatic actuators generally designated 304 and 305 which take the place of and which are equivalent to the magnets shown in the electrical embodiment.

Referring now to the mechanical embodiment in Fig. 6, here there is an equivalent receiving device A'' which is equivalently mechanically operated in place of being operated pneumatically or electrically. The impulse emitter B'' is provided with cam surfaces corresponding to the spots on the commutator heretofore explained for the electrical embodiment and corresponding to the ports in the pneumatic embodiment. Such cam portions initiate a mechanical impulse or transient mechanical representation of the series of digits and these impulses act through interposer members 306 to impart movement to mechanical members in the progression coordinators C'' and D''. Such mechanical members constitute an equivalent to the circuits in the electrical embodiment in the progression coordinator and are also equivalent to the ports of the pneumatic embodiment. The mechanical impulses which are imparted on these parts pass to multiplicand selector devices E'' and F''. Such multiplicand selector devices and denominational allocator devices comprise interposers 307 and 308 which impart the movement received from the progression coordinator to the linkage which extends to and actuates the proper orders of the receiving devices.

It will be understood that the receiving device is of a type well known in the accounting art and that other equivalent receiving devices may be substituted therefor.

The foregoing explanation shows that the transient representations of the digits may be created electrically, pneumatically or equivalent representations may be created mechanically. The coordination or the progressions of such representations may be also effected electrically, or in an equivalent manner pneumatically or mechanically. Furthermore, the selection of the impulses from the progression created by the coordinator can also be effected electrically, pneumatically or mechanically. Such selection from the progression in accordance with the multiplicand can also allocate denominational orders to the impulse representations in an electrical manner, or in an equivalent pneumatic or mechanical manner. Entry into the accumulators furthermore may be made in an electrical manner or in an equivalent pneumatic or mechanical manner.

Heretofore in the specification and hereafter in the claims the terms "notations" and "progressions" are used. By notation when referring to the decimal system, the Arabic notation of nine digits is signified and for any other system such as twelfths here referred to as the duo decimal system the notation series from 0 to 11 inclusive is intended. This expression similarly applies to any other notation which may or may not be factors of the above. As a factorial notation related to the duo decimal notation the notation 0 to 5 and 0 to 2 and 0 to 3 may be cited indicating even fractional parts such as sixths, thirds and quarters. A notation as above defined is likewise a progression according to a unit increment and the term "notation" is used in this sense. The term "progression" is used in the commonly accepted mathematical sense, viz, a series of numbers which increase by a common difference. In forming the product representing impulses, use is made of this progression term to define the progression which is based upon the notation and one of the factors of the computation. For example, with the decimal notation and a multiplier of 3, the progression would be as follows: 3, 6, 9, 12, 15, 18, 21, 24 and 27.

The term "transient representation" has also been employed. Such term refers broadly to a representation which is created and which may then be obliterated. For brevity in disclosure, I have shown and fully described an electrical embodiment of the invention in which the transient representations are electrically created and in which the representations are distinguished by their differential timed relationship.

Broadly the invention is not limited to electrical current impulses. Any transient actuating impulses whether mechanically, pneumatically or electrically created and which after creation are obliterated, but which during their existence are capable of representing a digit or digits is within the spirit and scope of the present invention as defined in the appended claims.

The embodiment of the invention which has been described in full detail includes also a progression coordinator, a multiplicand selector and denominational allocator and registers or receiving devices, all of which are of electrical type. I have, however, briefly set forth in the present disclosure, manners and methods of effecting corresponding computing operations in equivalent mechanical, pneumatic and electrical manner. Accordingly, the invention broadly is not limited to an electrical embodiment, nor to electrical current impulses or representations, nor to a progression coordinator of electrical type, nor to a multiplicand selector or receiving devices of such type.

The broad underlying principles of the present invention lend themselves equally well to other embodiments as has been shown by the brief explanation of the analogous mechanical, pneumatic and electrical constructions. The coordination of the representations into a progression may broadly relate to effecting such coordination mechanically, electrically, pneumatically or otherwise. The selection from the coordinated progression and allocation of the denominational values may also be effected in like equivalent manner and the receiving devices or registers can likewise be equivalently controlled. All of such features are within the spirit and scope of the present invention as defined in the appended claims.

What I claim is:

1. A calculating machine with factor entry means, one for entering a term of a compound denominate number and the other for entering the other factor of a computation, a receiving device adapted for control by differentially timed impulses and to show results in compound denominate form, said receiving device including means for receiving and accumulating entries based upon different notations, impulse emitting means for timing the emission of a set of differentially timed impulses representative of the numbers of one notation, other impulse emitting means for timing the emission of another set of differentially timed impulses representative of the numbers of a different notation, and means for creating under the control of the factor entry means compound denominate number product representing impulses from the impulses provided by the foregoing emitting means and which product representing impulses correspondingly control the operation of the receiving device.

2. A calculating machine including a set of numeral lines one for each numeral of a notation, a single common emitter for creating and impressing a single set of differentially timed impulses representative of all of the numerals of a notation in order upon the set of numeral lines, a set of supplemental lines in number equal to the numerals of the notation, coordinating devices under the control of one entered factor to receive impulses from the numeral lines and coordinate their flow to the supplemental lines in accordance with a progression based on an entered factor, a multi-denominational receiver operating in synchronism with the emitter, a set of denominational lines leading thereto, and selecting and denominational allocating means under the control of a second entered factor and associated with the supplemental lines and the denominational lines for selecting impulse flow and allocating denominational values to the impulses which flow to the receiver.

3. A multiplying machine with means for separately accumulating left and right hand components of partial products, a single impulse emitting means for emitting impulses which by their differential time of emission are representative of numbers of a notation and which when emitted have no denominational value, coordinating means for coordinating the impulses into representations of a progression based upon one factor, selecting means for selecting certain of the coordinated impulses and allocating denominational value thereto and for concurrently directing the flow of the impulses which are representative of left and right hand components of partial products into the accumulating means.

4. A calculating machine including a plurality of sets of numeral lines, one set for each notation, and each set comprising a plurality of numeral lines one line for each numeral of the related notation, a plurality of emitters, one emitter for each notation employed in the computation and each emitter being a single common impulse emitter for creating and impressing a single set of differentially timed impulses representative of all of the numerals of its notation in order upon the related set of numeral lines, a plurality of sets of supplemental lines for the different notations, each set having lines which in number are equal to the numerals of the notation, coordinating devices under the control of one entered factor to receive impulses from the sets of numeral lines and coordinate their flow to the sets of supplemental lines in accordance with a progression based on an entered factor, a multi-denominational receiver having entry receiving elements for the different notations employed in the computation and which elements operate in synchronism with the related emitters, a set of denominational lines leading to the receiver, and selecting and denominational allocating means under the control of a second entered factor and associated with the sets of supplemental lines and the denominational lines for selecting impulse flow and allocating denominational values to the impulses which flow to the receiver.

5. In a multiplying machine with receiving devices of the timed impulse type, with column shift means to variably direct impulses thereto and multiplicand selector switching means for selectively controlling impulse flow to the column shift means from a set of progression lines over which timed impulses arranged according to a progression are adapted to flow, and including in combination, an impulse emitter for timing the emission of impulses, progression establishing switching means for the other factor, a plurality of numeral lines interposed between said impulse emitter and the progression establishing switching means, said progression establishing switching means being disposed between the set of numeral lines and the progression lines for converting timed impulses transmitted to the numeral lines by the emitter into sets of impulses arranged according to a progression for flow over the progression lines.

6. In a multiplying machine with a set of progression lines over which timed impulses arranged according to a progression are adapted to flow to a receiving device, and including in combination, a single impulse emitter for timing the emission of differentially timed impulses, a set of numeral lines one for each digit of a notation connected in fixed columnar relation to the emitter for all calculations, each line invariably transmitting the same impulse for all calculations whenever the remainder of its circuit is completed and the different lines transmitting different timed impulses, and progression establishing switching means disposed between the numeral lines and the progression lines for converting timed impulses transmitted to the numeral lines by the emitter into sets of impulses arranged according to a progression for flow over the progression lines.

7. In a calculating machine, in combination, an impulse emitter for timing the emission of differentially timed impulses representing the different digits of a notation, a plurality of lines one for each of the different digits connected to said emitter in fixed columnar relationship for all calculations for transmitting timed impulses from the emitter, each line invariably transmitting the same impulse and representing the same digit for all calculations whenever the remainder of its circuit is completed and the timed impulse transmitted by each line being different from that transmitted by another line, a multi-denominational order receiver, and selector means connected to said emitter through said lines for determining which of the timed impulses transmitted by said lines shall be utilized in multi-denominational orders of said receiver.

8. A calculating machine with a multi-denominational order receiver, a single and common impulse emitting means for emitting impulses timed to represent all of the numbers of a notation for entry into any or all denominational orders of the receiver, a set of numeral lines one for each digit of a notation connected in fixed columnar relationship to the emitting means for all calculations, each line invariably transmitting the same impulse for all calculations whenever the remainder of its circuit is completed and the different lines transmitting different timed impulses, and means intermediate the said numeral lines and the receiver for allocating the said impulses according to denominational order values, said impulses when originally emitted to the numeral lines having no denominational order values, means for selecting which of said impulses are to flow to the receiver, said means including devices which are set up and retained set up for effecting such selection.

9. A multiplying machine including in combination with factor entry means, means for creating transient representations of the numbers in different notations used in a computation, said last mentioned means including dual means for creating the aforesaid representations, one means creating representations for the numbers in one notation of the compound denominate number and the other means creating representations of the numbers in the other notation of the compound denominate number, means under the control of one factor entry means for coordinating said representations into a compound denominate progression and means under the control of the other factor entry means for selecting and allocating digital representations from said compound denominate progression, and product receiving accumulating means controlled by the representations selected by the foregoing means, said product receiving accumulating means having a section which receives the representations in one notation and another section which receives the representations in another notation.

10. An impulse flow coordinating means for a multiplying machine including two impulse emitting means for creating differentially timed impulses according to the numbers of the two different notations involved in a calculation, one single emitter being provided for each notation involved and means including settable factor entry means for coordinating said impulses according to progressions in said different notations involved in the calculation, said progressions being related to one of the factors of the calculation.

11. A impulse flow coordinating means according to claim 10 wherein further means are provided including a settable factor entry means for the other factor for selecting impulses from said progressions, said selection being effected according to the other factor of the calculation.

12. A multiplying machine with an accumulator having denominational elements to accumulate numbers of different notations, a plurality of impulse emitters one for the numbers of each different notation involved in a multiplying computation, each with provisions for emitting differentially timed impulses, and means intermediate the emitter or emitters and the accumulator for selecting and directing the impulses from said emitter or emitters to the related notational elements of the accumulator, said last means including multiplicand and multiplier factor set up means.

13. A multiplying machine with multi-denominational order receiving means with certain denominational elements thereof adapted to receive entries in one notation and other denominational elements thereof adapted to receive entries in another and different notation, means for emitting impulses timed to represent all of the numerical values of the notations in any denominational order of compound denominate numbers, said means comprising impulse emitting means for timing the emission of differential timed impulses representative of the numbers of one notation and other impulse emitting means for timing the emission of another set of impulses representative of the numbers of a different notation, and means intermediate the emitting means and the receiving means for selecting and allocating said impulses according to their relative compound denominate value, said last named means comprising two separate settable impulse selecting means positioned in accordance with the two factors of a computation, fixed circuits to transmit the different notational impulses to different orders of the receiving device and column shift means for determining impulse distribution.

14. A compound denominate number multiplying machine, comprising factor entry means for a compound denominate number, factor entry means for a regular number, receiving devices conjointly controlled thereby for receiving and accumulating entries based upon different notations, means supplying representations of the numbers of one notation, means supplying representations of the numbers in another notation, means under conjoint control of both factor entry means for selecting representations derived from both of the representation supplying means and for forming representations of partial products of a compound denominate number multiplied by a regular number, a main operating means, and means operable automatically by the main operating means for causing operation of the representation supplying means and entry of compound denominate partial products in said receiving devices.

15. A machine according to claim 14 wherein said receiving devices comprise a plurality of partial product receiving accumulators, certain of which accumulators include elements for accumulating amounts in different notations, and wherein further means are provided controlled by the main operating means for automatically gathering the partial products entered in the several accumulators in one of said different notation accumulators.

16. A calculating machine with plural factor entry means, one for entering the terms of a compound denominate number as one factor and the other for entering a regular number as the other factor, receiving means for receiving and accumulating entries based upon different notations, means for supplying representations of the numbers in the different notations of the compound denominate number, means under the control of the factor entry means for selecting representations supplied by said supplying means corresponding to compound denominate number partial products of the entered factors and for transmitting the same to said receiving means, and means for causing said selected representations to be entered into the respective notational orders of the receiving means.

17. In a calculating machine, in combination, an impulse emitter for timing the emission of differentially timed impulses representing the different digits of a notation, a plurality of lines one for each of the different digits connected to said emitter in fixed columnar relationship for all calculations for transmitting timed impulses from the emitter, each line invariably transmitting the same impulse and representing the same digit for all calculations whenever the remainder of its circuit is completed and the timed impulse transmitted by each line being different from that transmitted by another line, a multi-denominational order accumulator, and selector means connected to said emitter through said lines for determining which of the timed impulses transmitted by said lines shall be utilized in multi-denominational orders of said accumulator.

18. A calculating machine with a multi-denominational order accumulator, a single and common impulse emitting means for emitting impulses timed to represent all of the numbers of a notation for entry into any or all denominational orders of the accumulator, a set of numeral lines one for each digit of a notation connected in fixed columnar relationship to the emitting means for all calculations, each line invariably transmitting the same impulse for all calculations whenever the remainder of its circuit is completed and the different lines transmitting different timed impulses, and means intermediate the said numeral lines and the accumulator for allocating the said impulses according to denominational order values, said impulses when originally emitted to the numeral lines having no denominational order values, means for selecting which of said impulses are to flow to the accumulator, said means including devices which are set up and retained set up for effecting such selection.

19. In a calculating machine, impulse timing, routing and selecting means, comprising in combination, an impulse emitter for timing the emission of differentially timed impulses representing the different digits of a notation, a plurality of lines one for each of the different digits connected to said emitter in fixed columnar relationship for all calculations for transmitting timed impulses from the emitter, each line invariably transmitting the same impulse and representing the same digit for all calculations whenever the remainder of its circuit is completed and the timed impulse transmitted by each line being different from that transmitted by another line, a multi-denominational order set of impulse receiving lines, and selector means connected to said emitter through said first mentioned lines for determining which of the timed impulses transmitted by said first mentioned lines shall flow over and be utilized in multi-denominational order lines of said impulse receiving lines.

20. Impulse timing, routing and selecting means for a calculating machine having a multi-denominational order set of result lines, a single and common impulse emitting means for emitting impulses timed to represent all the numbers of a notation for entry into any or all denominational orders of said result lines, a set of numeral lines one for each digit of a notation connected in fixed columnar relationship to the emitting means for all calculations, each numeral line invariably transmitting the same timed impulse whenever the remainder of its circuit is completed, means intermediate the said numeral lines and the result lines for allocating said impulses according to denominational order values, said impulses when originally emitted to the result lines having no denominational order values, means for also selecting which of said impulses are to flow to the result lines, said means including devices which are set up and retained set up for effecting such selection.

JAMES W. BRYCE.